US009019177B2

(12) United States Patent
Yamashita et al.

(10) Patent No.: US 9,019,177 B2
(45) Date of Patent: Apr. 28, 2015

(54) STORAGE MEDIUM STORING IMAGE PROCESSING PROGRAM AND IMAGE PROCESSING APPARATUS

(75) Inventors: Yoshikazu Yamashita, Kyoto (JP); Keiichi Minato, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 2249 days.

(21) Appl. No.: 11/987,161

(22) Filed: Nov. 28, 2007

(65) Prior Publication Data

US 2009/0085935 A1 Apr. 2, 2009

(30) Foreign Application Priority Data

Oct. 1, 2007 (JP) .................................. 2007-257821

(51) Int. Cl.
*G06F 3/01* (2006.01)
*G06F 3/0481* (2013.01)
*G06F 3/03* (2006.01)

(52) U.S. Cl.
CPC ....... *G06F 3/0481* (2013.01); *A63F 2300/1087* (2013.01); *A63F 2300/6653* (2013.01); *G06F 3/017* (2013.01); *G06F 3/0325* (2013.01); *G06F 2203/04806* (2013.01)

(58) Field of Classification Search
CPC .. G09G 2340/0407; G06T 3/40; G06F 3/038; G06F 3/0338; G06F 3/0304; G06F 3/0346
USPC ........................................ 345/660, 157, 158
See application file for complete search history.

(56) References Cited

U.S. PATENT DOCUMENTS

| 6,323,839 | B1 * | 11/2001 | Fukuda et al. ................. 345/157 |
| 7,379,078 | B1 | 5/2008 | Gossweiler, III et al. |
| 2006/0152488 | A1 * | 7/2006 | Salsman et al. ................ 345/158 |
| 2007/0060385 | A1 | 3/2007 | Dohta |
| 2009/0219303 | A1 * | 9/2009 | Thelen et al. ................. 345/672 |

FOREIGN PATENT DOCUMENTS

| JP | 2007-80002 A | 3/2007 |
| JP | A-2007-236697 | 9/2007 |

OTHER PUBLICATIONS

Japanese Office Action dated Feb. 13, 2013, issued in Japanese Patent Application No. 2010-049582.
Office Action dated Aug. 28, 2012 in continuation U.S. Appl. No. 13/476,705.

* cited by examiner

*Primary Examiner* — Chante Harrison
(74) *Attorney, Agent, or Firm* — Nixon & Vanderhye P.C.

(57) ABSTRACT

An image is placed, based on a predetermined designation input, on a predetermined placement position in relation to a display area, and displayed. The image is enlarged and reduced in accordance with an enlargement ratio of the image, and an area within which the placement position can be set is changed in relation to the display area in accordance with the enlargement ratio. Then, based on an obtained designation input, a position within the area, which position corresponds to the designation input, is calculated as a placement position, and the image having been enlarged and reduced is placed on the placement position. The image is then displayed on a display device.

13 Claims, 21 Drawing Sheets

F I G. 3
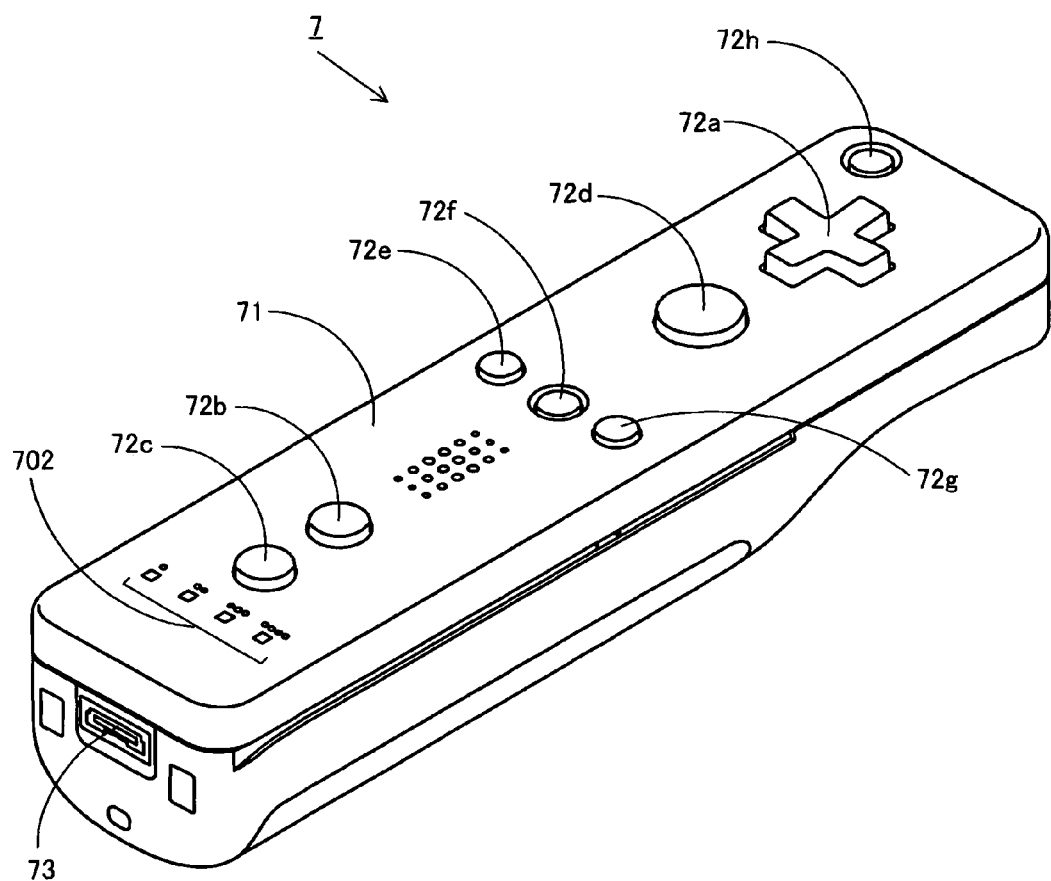

F I G. 7
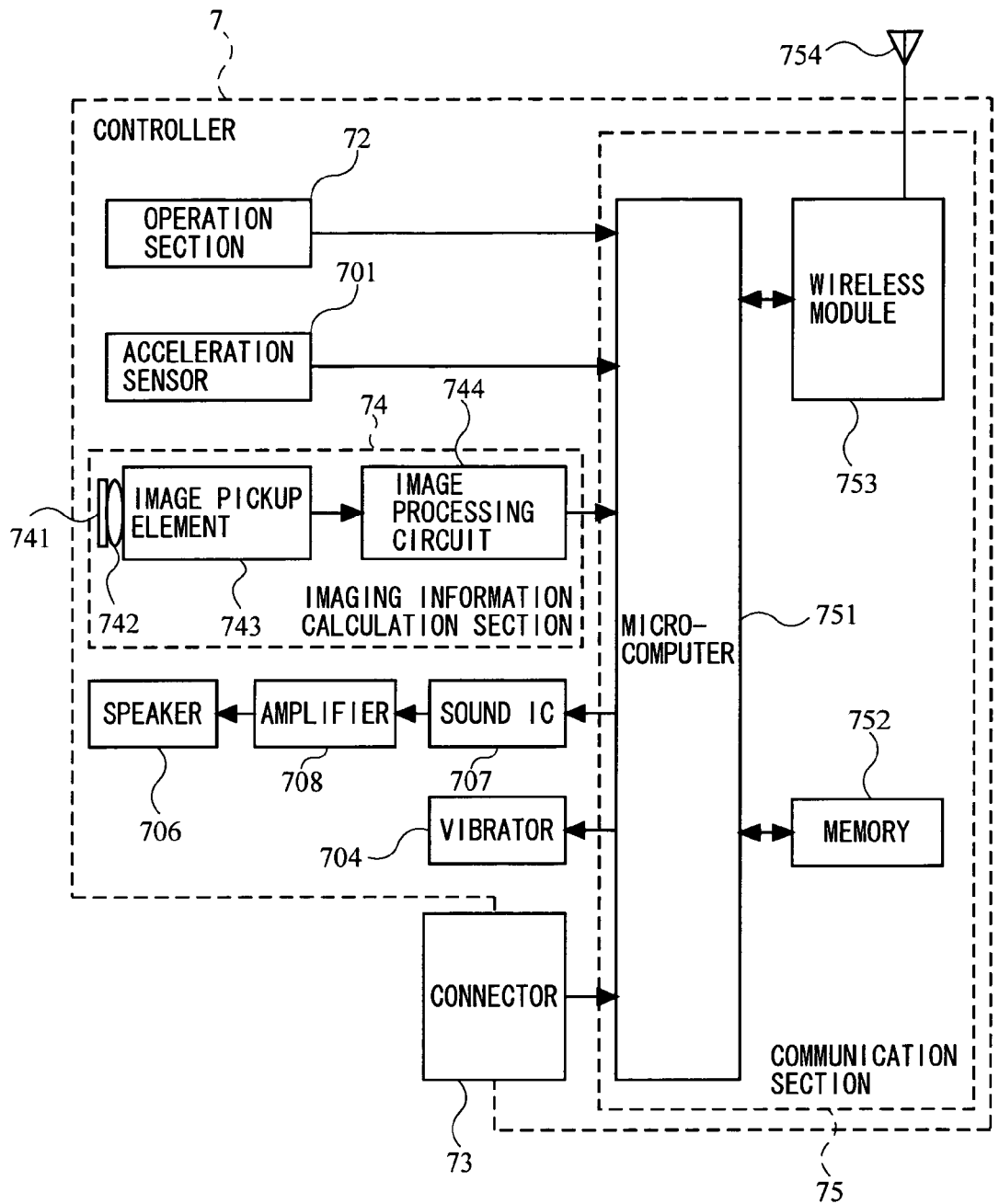

F I G. 8
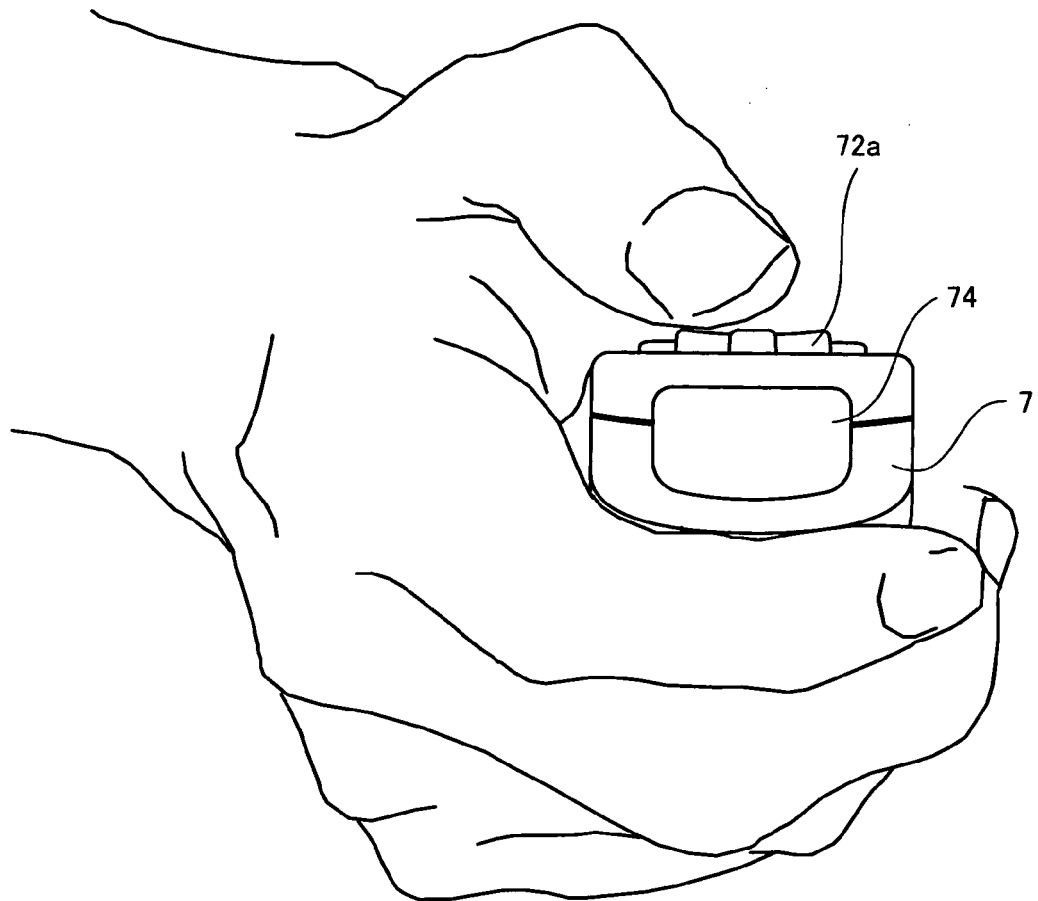

F I G. 1 3
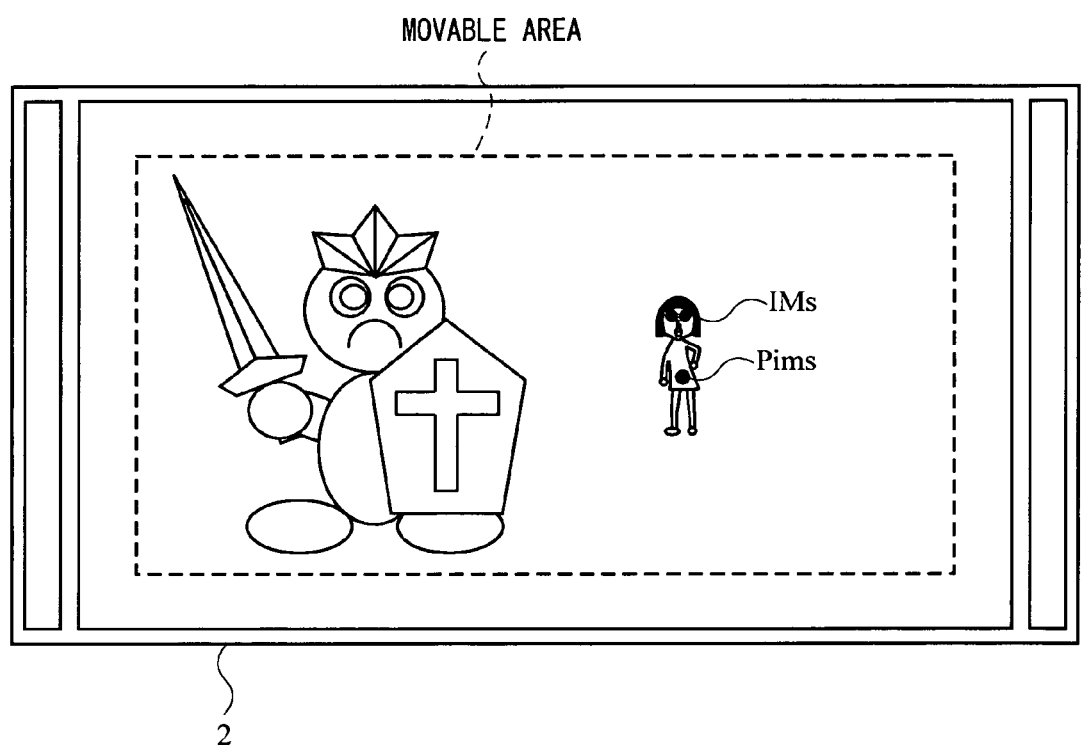

F I G. 1 7
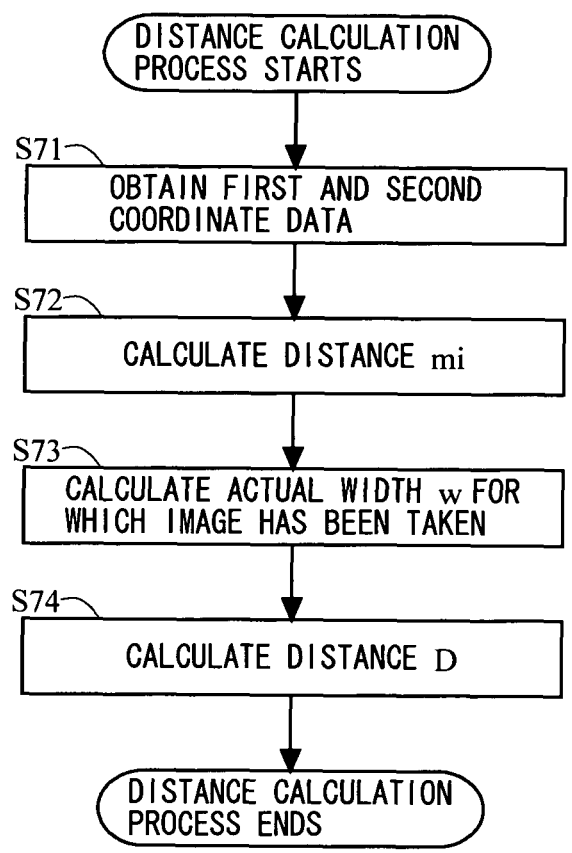

FIG. 18
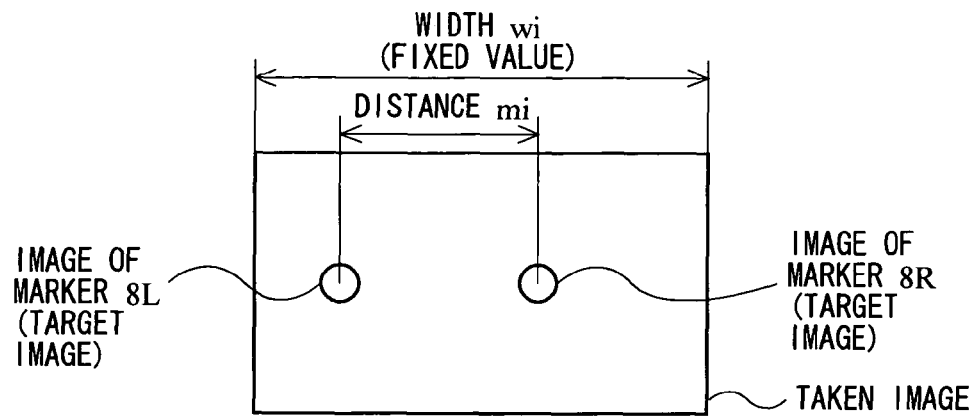
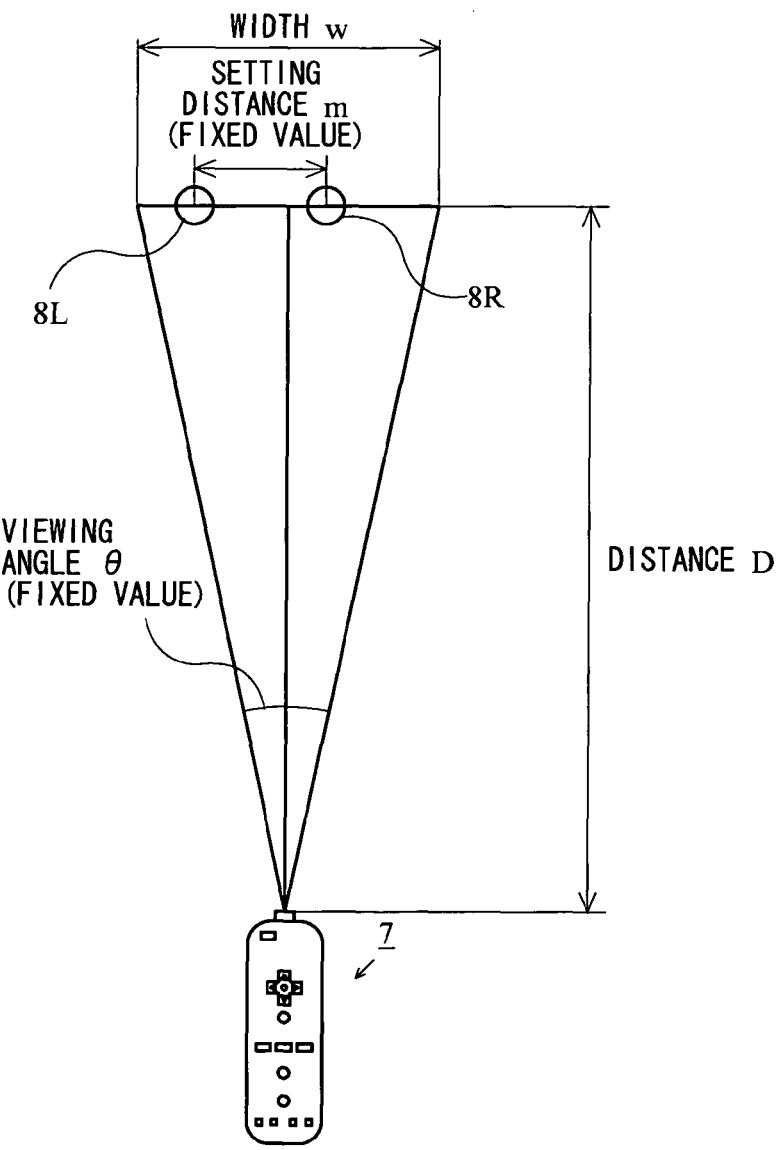

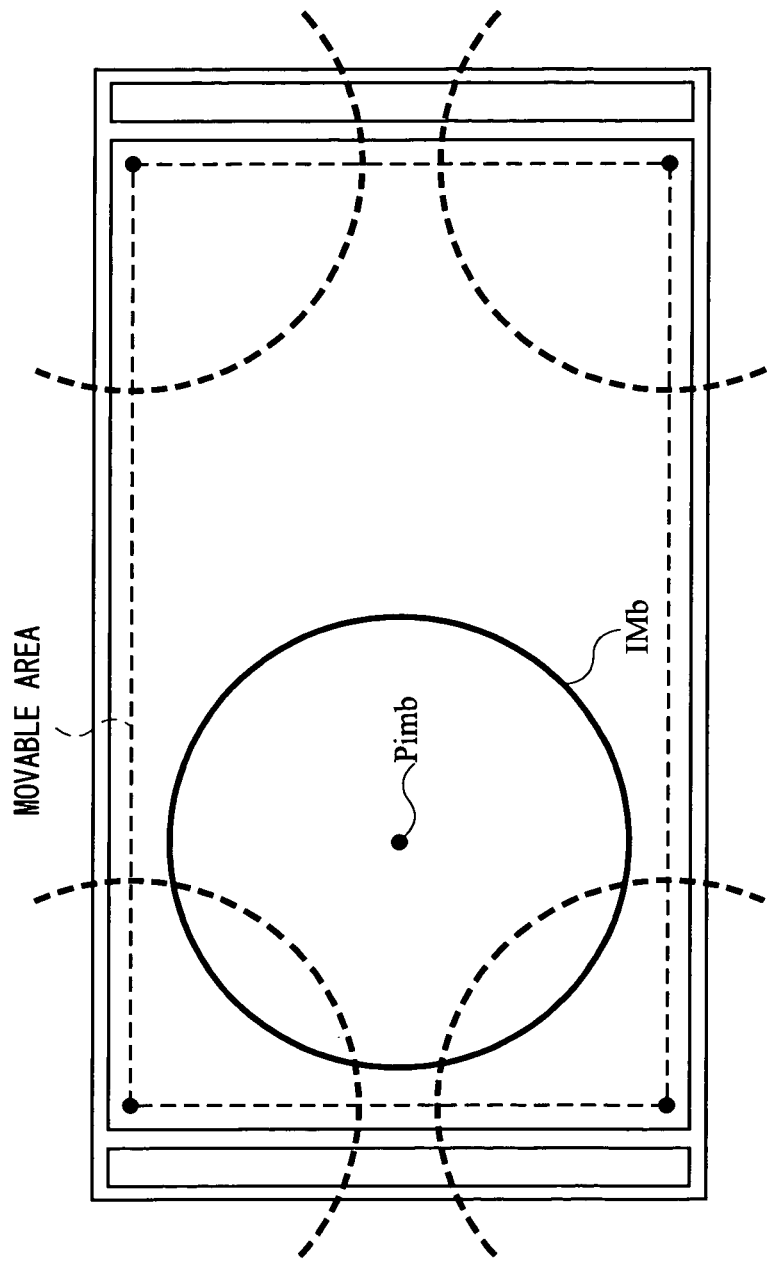

STORAGE MEDIUM STORING IMAGE PROCESSING PROGRAM AND IMAGE PROCESSING APPARATUS

CROSS REFERENCE TO RELATED APPLICATION

The disclosure of Japanese Patent Application No. 2007-257821, Oct. 1, 2007, is incorporated herein by reference.

TECHNICAL FIELD

The present invention relates to a storage medium storing an image processing program and an image processing apparatus. The present invention particularly relates to a storage medium, which stores an image processing program for placing and displaying an image on a designated placement position, and an image processing apparatus.

BACKGROUND AND SUMMARY

Conventionally, an image processing apparatus for enlarging/reducing an image in accordance with a distance between an input device and imaging targets (markers) is disclosed by Japanese Laid-Open Patent Publication No. 2007-236697 (hereinafter, referred to as Patent Document 1), for example. In the image processing apparatus disclosed by Patent Document 1, a controller has an image-pickup device for taking an image of two markers, and based on a distance between the two markers in the taken image, the distance between the input device and imaging targets (i.e., the markers) is calculated. Then, an image is: enlarged/reduced based on the calculated distance; placed on a position which corresponds to coordinates of a middle point between the two markers (e.g., a position pointed by the controller); and then displayed on a display device.

However, as shown in FIGS. 20A and 20B, in the case of the image processing apparatus disclosed by Patent Document 1, operability deteriorates when an area within which an image can be moved is fixed for images respectively having different enlargement ratios. In FIG. 20A, an area within which coordinates Pims, which indicate a position of an image IMs having a relatively low enlargement ratio, can be moved (movable area) is set. In the example of FIG. 20A, the movable area is set such that when the image IMs moves to a farthest edge of the movable area, almost the entire image IMs is displayed on a display screen, and a part of the image IMs is outside the display screen.

In FIG. 20B, similarly to the case of the image IMs, a movable area of coordinates Pimb is set for an image IMb having a relatively high enlargement ratio. In this case, the movable area is set such that when the image IMb moves to a farthest edge of the movable area, ¼ of the image IMs is displayed within the display area, and ¾ of the image IMs is outside the display area. Thus, in the case where the image IMb having a relatively high enlargement ratio is moved, as compared to the case where the image IMs is moved, when the image IMb is moved to the farthest edge of the movable area, a large portion of the image IMb remains within the display screen, and therefore it is likely that a user wishes to move the image IMb further to the outside of the movable are. However, such a wish of the user cannot be met since the movable area is fixed, and this results in operability deterioration for the user.

In the case of setting, assuming that the image IMb is to be moved, the movable area so as to extend to the outside of the display area, it is conceivable that if the image IMs having a relatively low enlargement ratio is moved within the movable area having extended to the outside of the display area, the image IMs disappears from the display area, and is not displayed on the display screen. In such a case, the user is unable to know where the image IMs is positioned, and this causes deterioration in operability.

Further, in the case where the image, which is placed on the position corresponding to the coordinates of the middle point between the two markers, is displayed on the display device, there is a possibility that the position to be designated varies depending on the distance between the controller and the markers. To be specific, in the case where the controller is operated at a remote position from the markers, even if a direction of the image-pickup device of the controller (i.e., direction in which the controller is pointed) is slightly changed, the designated position changes greatly, as compared to a case where the controller is operated near the markers. In other words, even if the user performs a same operation by using the controller, a result of the operation varies depending on the distance from the markers.

Therefore, a feature of the present invention is to solve at least one of the above-described problems, and to provide a storage medium storing an image processing program and an image processing apparatus which are capable of properly controlling a movement of an image in accordance with an enlargement ratio of the image or the distance between the image-pickup device and the imaging targets.

The present invention has the following features. Note that reference numerals, step numbers (here, "step" is abbreviated as "S"), diagram numbers and the like indicated between parentheses are merely provided to facilitate the understanding of the present invention in relation to the later-described best mode embodiment, rather than limiting the scope of the present invention in any way.

A first aspect of the present invention is a computer-readable storage medium storing an image processing program to be executed by a computer (10) of an image processing apparatus (5) for: enlarging or reducing an image (IM); placing the image on a predetermined placement position (Pim) in relation to a display area in accordance with a predetermined designation input (Da; (Lx, Ly), (Rx, Ry)); and displaying the image. The image processing program causes the computer to function as designation input obtaining means (CPU 10 performing steps 50 and 64; hereinafter, only step numbers are indicated), enlarging and reducing means (S55, S60), area setting means (S57), placement position calculation means (S58), image placing means (S61), and display control means (S62). The designation input obtaining means obtains the designation input. The enlarging and reducing means sets an enlargement ratio (Sx, Sy) of the image, and enlarges and reduces the image in accordance with the enlargement ratio. In accordance with the enlargement ratio (STx and STy calculated based on Sx and Sy) set by the enlarging and reducing means, the area setting means changes, in relation to the display area, an area within which the placement position is allowed to be set. The placement position calculation means calculates, based on the designation input obtained by the designation input obtaining means, a position within the area as the placement position, the position corresponding to the designation input. The image placing means places, on the placement position, the image enlarged and reduced by the enlarging and reducing means. The display control means causes a display device (2) to display the image placed by the image placing means. Note that, the area, within which the placement position is allowed to be set and which is set on the display area, may be in the same size as the display area, or smaller than the display area, or larger than the display area.

In a second aspect of the present invention based on the first aspect, the area setting means sets the area so as to extend in accordance with an increase in the enlargement ratio set by the enlarging and reducing means.

In a third aspect of the present invention based on the second aspect, the designation input obtaining means obtains the designation input from an input device (7) having an image-pickup device (74) for taking an image of a predetermined imaging target (8). The image processing program further causes the computer to function as distance calculation means (S52, S65) for calculating a distance (D) between the imaging target and the image-pickup device. The enlarging and reducing means increases the enlargement ratio in accordance with a decrease in the distance. The placement position calculation means calculates the placement position based on the enlargement ratio and a position of the imaging target in the image taken by the image-pickup device.

In a fourth aspect of the present invention based on the third aspect, the placement position calculation means calculates the placement position in the area set by the area setting means, by changing, based on the enlargement ratio, a rate of change of the placement position in relation to a change of the position of the imaging target in the taken image.

In a fifth aspect of the present invention based on the third aspect, a plurality of imaging targets are provided. The distance calculation means calculates a distance between the image-pickup device and the imaging targets, based on a distance (mi) between the imaging targets in the taken image.

In a sixth aspect of the present invention based on the fifth aspect, the computer is further caused to function as orientation calculation means (S54) and image orientation determination means (S59). The orientation calculation means calculates an orientation of the input device, based on a gradient (Db1) between the imaging targets in the taken image. The image orientation determination means determines an orientation (Aim) of the image in accordance with the orientation of the input device. The image placing means places, in the orientation determined by the image orientation determination means, the image enlarged and reduced by the enlarging and reducing means.

In a seventh aspect of the present invention based on the first aspect, the area setting means uses an aspect ratio of the image, thereby changing an aspect ratio of the area which is changed in accordance with the enlargement ratio.

In an eighth aspect of the present invention based on the seventh aspect, the computer is further caused to function as image orientation determination means for determining an orientation of the image in accordance with the designation input. The area setting means uses the aspect ratio and the orientation of the image, thereby changing the aspect ratio of the area which is changed in accordance with the enlargement ratio.

A ninth aspect of the present invention is a computer-readable storage medium storing an image processing program to be executed by a computer of an image processing apparatus for: placing the image on a predetermined placement position in relation to a display area in accordance with a designation input obtained from an input device having image-pickup means for taking an image of an imaging target; and displaying the image. The image processing program causes the computer to function as designation input obtaining means, distance calculation means, placement position calculation means, image placing means and display control means. The designation input obtaining means obtains the designation input from the input device. The distance calculation means calculates, based on a position of the imaging target in the taken image, a distance between the imaging target and the image-pickup means. Based on the distance, the placement position calculation means changes a rate of change of the placement position in relation to a change of the position of the imaging target in the taken image, thereby calculating the placement position. The image placing means places the image on the placement position. The display control means causes a display device to display the image placed by the image placing means.

In a tenth aspect of the present invention based on the ninth aspect, the placement position calculation means calculates the placement position in such a manner as to increase the rate of change of the placement position in accordance with a decrease in the distance calculated by the distance calculation means.

In an eleventh aspect of the present invention based on the tenth aspect, the computer is further caused to function as area setting means for, in accordance with the distance calculated by the distance calculation means, changing, in relation to the display area, an area within which the placement position is allowed to be set. The area setting means sets the area so as to extend in accordance with a decrease in the distance calculated by the distance calculation means.

In a twelfth aspect of the present invention based on the ninth aspect, a plurality of imaging targets are provided. The distance calculation means calculates a distance between the image-pickup means and the imaging targets, based on a distance between the imaging targets in the taken image.

A thirteenth aspect of the present invention is an image processing apparatus for: enlarging or reducing an image; placing the image on a predetermined placement position in a display area of a display device in accordance with a predetermined designation input; and displaying the image. The image processing apparatus comprises designation input obtaining means, enlarging and reducing means, area setting means, placement position calculation means, image placing means and display control means. The designation input obtaining means obtains the designation input. The enlarging and reducing means sets an enlargement ratio of the image, and enlarges and reduces the image in accordance with the enlargement ratio. In accordance with the enlargement ratio set by the enlarging and reducing means, the area setting means changes, in relation to the display area, an area within which the placement position is allowed to be set. The placement position calculation means calculates, based on the designation input obtained by the designation input obtaining means, a position within the area as the placement position, the position corresponding to the designation input. The image placing means places, on the placement position, the image enlarged and reduced by the enlarging and reducing means. The display control means causes a display device to display the image placed by the image placing means.

In a fourteenth aspect of the present invention based on the thirteenth aspect, the area setting means sets the area so as to extend in accordance with an increase in the enlargement ratio set by the enlarging and reducing means.

In a fifteenth aspect of the present invention based on the fourteenth aspect, the designation input obtaining means obtains the designation input from an input device having an image-pickup device for taking an image of a predetermined imaging target. The image processing apparatus further comprises distance calculation means for calculating a distance between the imaging target and the image-pickup device. The enlarging and reducing means increases the enlargement ratio in accordance with a decrease in the distance. The placement position calculation means calculates the placement position based on the enlargement ratio and a position of the imaging target in the image taken by the image-pickup device.

A sixteenth aspect of the present invention is an image processing apparatus for: placing an image on a predetermined placement position in relation to a display area of a display device in accordance with a designation input obtained from an input device having image-pickup means for taking an image of an imaging target; and displaying the image. The image processing apparatus comprises designation input obtaining means, distance calculation means, placement position calculation means, image placing means and display control means. The designation input obtaining means obtains the designation input from the input device. The distance calculation means calculates, based on a position of the imaging target in the taken image, a distance between the imaging target and the image-pickup means. The placement position calculation means changes, based on the distance, a rate of change of the placement position in relation to a change of the position of the imaging target in the taken image, thereby calculating the placement position. The image placing means places the image on the placement position. The display control means causes a display device to display the image placed by the image placing means.

In a seventeenth aspect of the present invention based on the sixteenth aspect, the placement position calculation means calculates the placement position in such a manner as to increase the rate of change of the placement position in accordance with a decrease in the distance calculated by the distance calculation means.

In an eighteenth aspect of the present invention based on the thirteenth aspect, the image processing apparatus further comprises area setting means for, in accordance with the distance calculated by the distance calculation means, changing, in relation to the display area, an area within which the placement position is allowed to be set. The area setting means sets the area so as to extend in accordance with a decrease in the distance calculated by the distance calculation means.

According to the above first aspect, the area within which the image can be moved (i.e., movable area) is set in accordance with the enlargement ratio of the image. This allows the movable area of the image to be set appropriately in accordance with the size of the image, and allows the movement of the image to be properly controlled in accordance with the enlargement ratio of the image.

According to the above second aspect, operability deterioration, such as the movable area becoming insufficient for an image having a high enlargement ratio, is prevented. Further, for an image having a low enlargement ratio, i.e., for an image displayed in a reduced size, the movable area is also in a reduced size. This prevents the image from disappearing from the display area.

According to the above third aspect, when the input device is moved toward the imaging target, the displayed image is enlarged, and the area within which the image can be moved is also enlarged. On the other hand, when the input device is moved away from the imaging target, the displayed image is reduced, and the area within which the image can be moved is also reduced. Thus, the image enlargement/reduction process can be performed only by changing the distance between the input device and imaging target, that is, the enlargement ratio of the displayed image can be changed by a simple operation. Also, the displayed image moves in response to the input device having been moved from side to side and up and down with respect to the imaging target. Thus, the displayed image can be moved by a simple operation.

According to the above fourth aspect, when the image is to be displayed at a position pointed by the input device, a designated moving amount of the image is greater in the case where the input device is positioned near the imaging target than in the case where the input device is at a remote position from the imaging target. As a result, increase/decrease, caused by a difference in distance between the input device and imaging target, of the moving amount of the image in relation to an amount of change in the position pointed by the input device, is lessened. In other words, for a user using the input device to perform an operation to move the pointed position, a significant change in operability does not occur even if the distance between the input device and the imaging target changes. This allows the user to perform the operation without feeling discomfort.

According to the above fifth aspect, the distance between the image-pickup device and the imaging targets can be easily calculated by using a distance between at least two imaging targets in the image taken by the input device.

According to the above sixth aspect, by performing such an operation as to twist the input device to the right and left, the user can cause the displayed image to rotate in accordance with the operation.

According to the above seventh aspect, the area within which the image can be moved is set based on the aspect ratio of the image. As a result, the movable area is set appropriately in accordance with a shape of the image, e.g., the image having a vertically long shape or a horizontally long shape.

According to the above eighth aspect, the area within which the image can be moved is set in accordance with the orientation of the image. As a result, the movable area can be set appropriately in accordance with, e.g., a change in the placement angle of the vertically-long-shaped or horizontally-long-shaped image, i.e., in accordance with the shape and placement angle of the image.

According to the above ninth aspect, the increase/decrease, caused by a difference in distance between the input device and imaging target, of the moving amount of the image in relation to the amount of change in the position pointed by the input device, can be adjusted. For example, when the image is to be displayed on the position pointed by the input device, even if an operation to move the pointed position is performed in a same manner, the moving amount of the pointed position changes depending on the distance between the input device and imaging target. Then, the moving amount of the image, which moves in response to the movement of the pointed position, increases/decreases accordingly. However, by adjusting the moving amount of the image in accordance with the distance between the input device and imaging target, operability related to the moving amount of the image, which moving amount is in response to an operation performed by the user to move the pointed position by using the input device, can be adjusted. This allows the user to perform the operation without feeling discomfort.

According to the above tenth aspect, when the image is to be displayed at the position pointed by the input device, a designated moving amount of the image is greater in the case where the input device is positioned near the imaging target than in the case where the input device is at a remote position from the imaging target. As a result, the increase/decrease, caused by a difference in distance between the input device and imaging target, of the moving amount of the image in relation to the amount of change in the position pointed by the input device, is lessened. In other words, for the user using the input device to perform an operation to move the pointed position, a significant change in operability does not occur even if the distance between the input device and the imaging target changes. This allows the user to perform the operation without feeling discomfort.

According to the above eleventh aspect, the area, within which the image can be moved, can be adjusted in size in accordance with the distance between the input device and imaging target, and the movable area can be enlarged in accordance with a decrease in the distance between the input device and imaging target.

According to the above twelfth aspect, the distance between the image-pickup device and the imaging targets can be easily calculated by using a distance between at least two imaging targets in the image taken by the input device.

According to the image processing apparatus of the present invention, the same effect as that provided by the above-described storage medium storing the image processing program can be obtained.

These and other objects, features, aspects and advantages of the present invention will become more apparent from the following detailed description when taken in conjunction with the accompanying drawings.

BRIEF DESCRIPTION OF THE DRAWINGS

FIG. 3 is an isometric view of the controller 7 of FIG. 1, seen from a top rear side thereof;

FIG. 7 is a block diagram showing a configuration of the controller 7 of FIG. 3;

FIG. 8 shows an exemplary state of a player holding the controller 7 with his/her right hand as seen from a front surface side of the controller 7;

FIG. 13 is an exemplary screen display which is provided on the monitor 2 in response to the operation shown in FIG. 11;

FIG. 17 shows a subroutine showing in detail a distance calculation process at steps 52 and 65 of FIG. 16;

FIG. 18 is a diagram for describing an operation to calculate a distance D;

FIG. 20B shows a conventional movable area for an image having a relatively high enlargement ratio.

DETAILED DESCRIPTION

Figure 1:
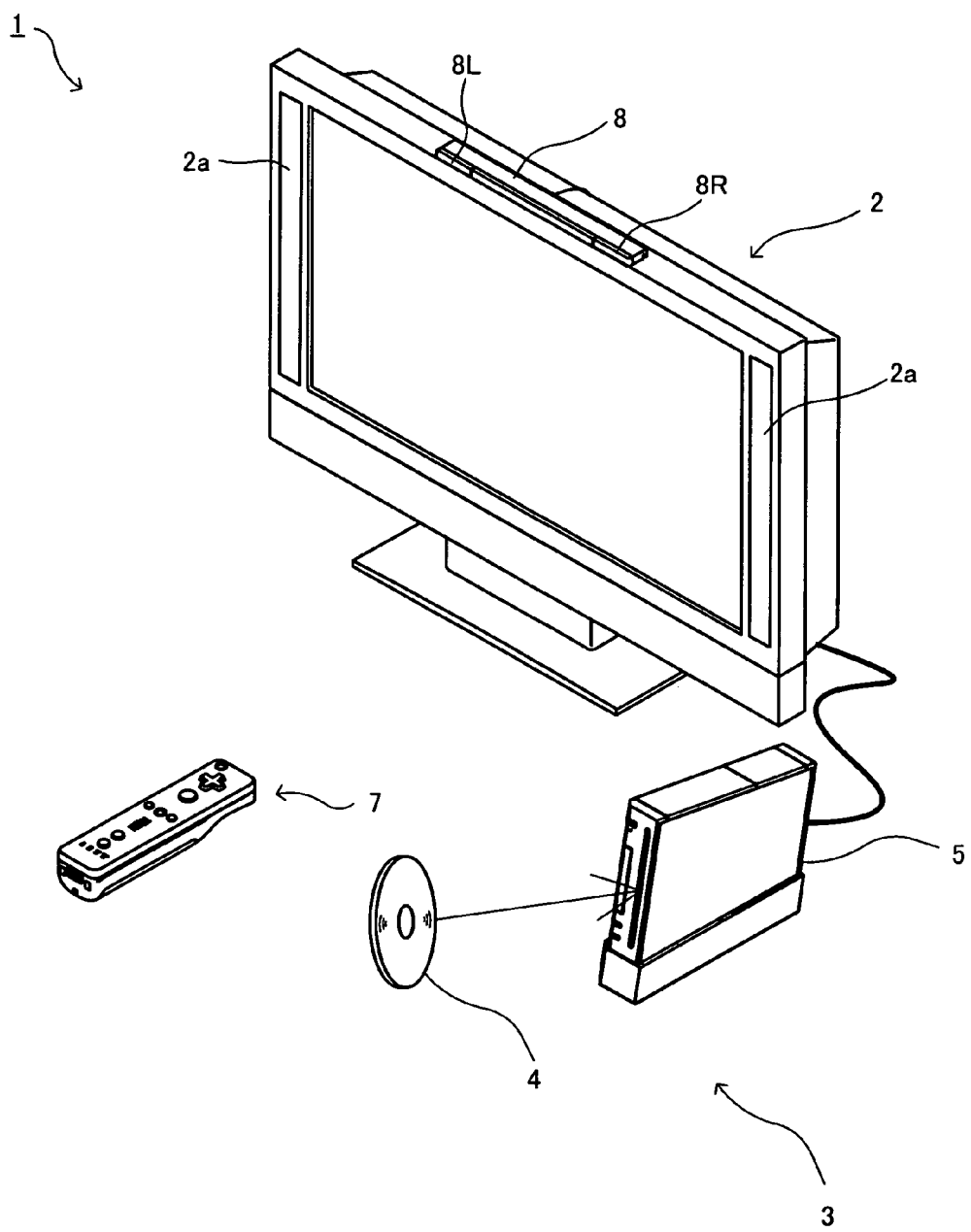
FIG. 1 is an external view illustrating a game system 1 according to an embodiment of the present invention.
Figure 2:
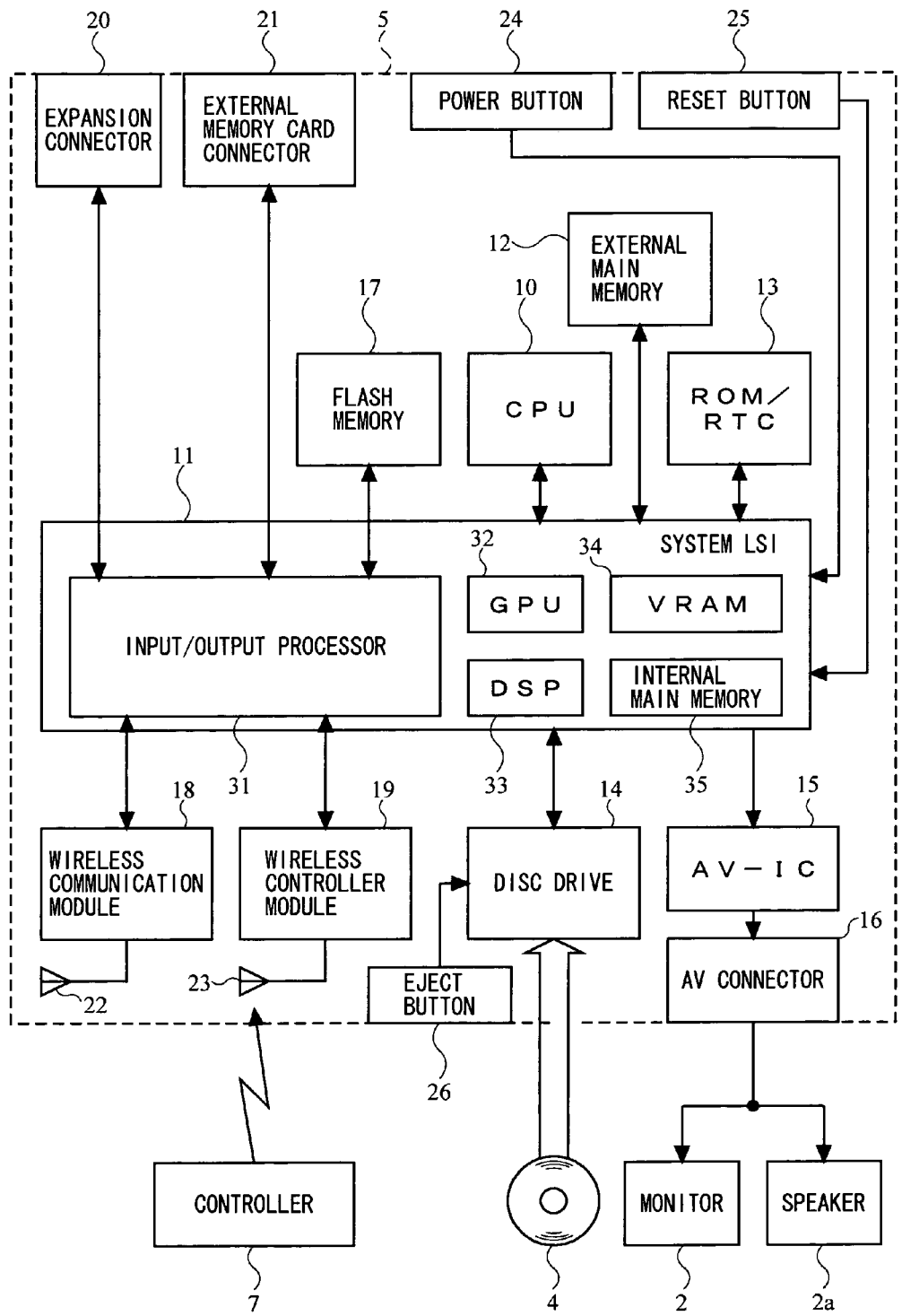
FIG. 2 is a functional block diagram of a game apparatus body 5 of FIG. 1.

With reference to FIG. 1, an apparatus for executing an image processing program according to an embodiment of the present invention will be described. Hereinafter, in order to give a specific description, a game system including a stationary game apparatus body 5 which is an example of the above apparatus will be described. FIG. 1 is an external view illustrating a game system 1 including a stationary game apparatus 3. FIG. 2 is a block diagram of the game apparatus body 5. The game system 1 will be described below.

As shown in FIG. 1, the game system 1 comprises: a home-use TV receiver 2 (hereinafter, referred to as a monitor 2) which is an example of display means; and the stationary game apparatus 3 connected to the monitor 2 via a connection cord. The monitor 2 has speakers 2a for outputting, in the form of sound, an audio signal outputted from the game apparatus body 5. The game apparatus 3 includes: an optical disc 4 in which a game program, which is an exemplary image processing program of the present invention, is stored; the game apparatus body 5 having a computer for executing the game program of the optical disc 4, thereby causing the monitor 2 to output a game display; and a controller 7 for providing the game apparatus body 5 with necessary operation information for a game in which a character or the like displayed in the game display is controlled.

The game apparatus body 5 has a wireless controller module 19 therein (see FIG. 2). The wireless controller module 19 receives data wirelessly transmitted from the controller 7, and transmits data from the game apparatus body 5 to the controller 7. In this manner, the controller 7 and game apparatus body 5 are connected by radio communication. Further, the optical disc 4 as an example of an exchangeable information storage medium is detachably mounted on the game apparatus body 5.

On the game apparatus body 5, a flash memory 17 (see FIG. 2) is mounted, the flash memory 17 functioning as a backup memory for fixedly storing, e.g., later-described various data and saved data for game software processing. The game apparatus body 5 executes the game program or the like stored on the optical disc 4, and displays a result thereof as a game image on the monitor 2. The game program or the like to be executed may be stored not only on the optical disc 4, but also prestored in the flash memory 17. The game apparatus body 5 can reproduce a state of the game played in the past, by using the saved data stored in the flash memory 17, and display a game image of the reproduced state on the monitor 2. A player playing with the game apparatus body 5 can enjoy the game by operating the controller 7 while watching the game image displayed on the monitor 2.

By using the technology of, for example, Bluetooth (registered trademark), the controller 7 wirelessly transmits transmission data such as operation information to the game apparatus body 5 having the wireless controller module 19 therein. The controller 7 is operation means for mainly controlling an object or the like displayed on a display screen of the monitor 2. The controller 7 has a housing, which is small enough to be held by one hand, and a plurality of operation buttons (including a cross key, a stick or the like) exposed at a surface of the housing. As described later in detail, the controller 7 includes an imaging information calculation section 74 for taking an image of a view seen from the controller 7. As exemplary imaging targets of the imaging information calculation section 74, two LED modules 8L and 8R (hereinafter, referred to as "markers 8L and 8R") are provided in the vicinity of the display screen of the monitor 2. The markers 8L and 8R each output, e.g., an infrared light forward from the monitor 2. The controller 7 is capable of receiving, at a communication section 75, transmission data wirelessly transmitted from the wireless controller module 19 of the game apparatus body 5, and generating a sound or vibration based on the transmission data.

Next, an internal configuration of the game apparatus body 5 will be described with reference to FIG. 2. FIG. 2 is a block diagram showing the configuration of the game apparatus body 5. The game apparatus body 5 has a CPU (Central Processing Unit) 10, system LSI (Large Scale Integration) 11, external main memory 12, ROM/RTC (Read Only Memory/Real Time Clock) 13, disc drive 14, AV-IC (Audio Video-Integrated Circuit) 15, and the like.

The CPU 10 performs game processing by executing the game program stored in the optical disc 4, and acts as a game processor. The CPU 10 is connected to the system LSI 11. In addition to the CPU 10, the external main memory 12, ROM/RTC 13, disc drive 14 and the AV-IC 15 are connected to the system LSI 11. The system LSI 11 performs processing such as: controlling data transfer among components connected to the system LSI 11; generating an image to be displayed; and obtaining data from external devices. An internal configuration of the system LSI 11 will be described later. The external main memory 12, which is a volatile memory, stores such a program as the game program loaded from the optical disc 4, or the game program loaded from the flash memory 17, and various data. The external main memory 12 is used as a work region or buffer region of the CPU 10. The ROM/RTC 13 has a ROM, in which a boot program for the game apparatus body 5 is incorporated (so-called boot ROM), and a clock circuit (RTC) which counts the time. The disc drive 14 reads program data, texture data and the like from the optical disc 4, and writes the read data into a later-described internal main memory 35 or into the external main memory 12.

On the system LSI 11, an input/output processor 31, a GPU (Graphic Processor Unit) 32, a DSP (Digital Signal Processor) 33, a VRAM (Video RAM) 34 and the internal main memory 35 are provided. Although not shown, these components 31 to 35 are connected to each other via an internal bus.

The GPU 32 partly forms rendering means, and generates an image in accordance with a graphics command from the CPU 10. The VRAM 34 stores necessary data for the GPU 32 to execute the graphics command (data such as polygon data and texture data). At the time of generating the image, the GPU 32 uses the data stored in the VRAM 34, thereby generating image data.

The DSP 33 acts as an audio processor, and generates audio data by using sound data and sound waveform (tone) data stored in the internal main memory 35 and external main memory 12. In order for the speakers 2a to output a sound, the DSP 33 reads the sound data, and causes the speakers 2a of the monitor 2 to output the sound data via the AV-IC 15 and an AV connector 16. In order for a speaker 706 (see FIG. 7) of the controller 7 to output a sound, the DSP 33 reads the sound data, and transmits the audio data to the controller 7 via the wireless controller module 19 and an antenna 23.

The image data and audio data generated in the above manner are read by the AV-IC 15. The AV-IC 15 outputs the read image data to the monitor 2 via the AV connector 16, and outputs the read audio data to the speakers 2a embedded in the monitor 2. As a result, the image is displayed on the monitor 2 and the sound is outputted from the speakers 2a.

The input/output processor (I/O Processor) 31 performs data transmission/reception with components connected thereto, and downloads data from external devices, for example. The input/output processor 31 is connected to the flash memory 17, a wireless communication module 18, the wireless controller module 19, an expansion connector 20 and an external memory card connector 21. An antenna 22 is connected to the wireless communication module 18, and the antenna 23 is connected to the wireless controller module 19.

The input/output processor 31 is connected to a network via the wireless communication module 18 and antenna 22, thereby communicating with other game apparatuses and various servers connected to the network. The input/output processor 31 regularly accesses the flash memory 17 to detect presence or absence of data which is required to be transmitted to the network. If such data is present, the data is transmitted to the network via the wireless communication module 18 and antenna 22. Also, the input/output processor 31 receives, via the network, antenna 22 and wireless communication module 18, data transmitted from other game apparatuses or data downloaded from a download server, and stores the received data in the flash memory 17. By executing the game program, the CPU 10 reads the data stored in the flash memory 17 to use the data for execution of the game program and image processing program. In addition to the data transmitted and received between the game apparatus body 5 and other game apparatuses or various servers, the flash memory 17 may store, as described above, saved data of the game which is played using the game apparatus body 5 (such as result data or progress data of the game).

Further, the input/output processor 31 receives, via the antenna 23 and wireless controller module 19, operation data or the like transmitted from the controller 7, and stores (temporarily) the operation data or the like in a buffer region of the internal main memory 35 or external main memory 12. Note that, similarly to the external main memory 12, the internal main memory 35 may store such a program as the game program loaded from the optical disc 4, or the game program loaded from the flash memory 17, and various data. The internal main memory 35 may be used as a work region or buffer region of the CPU 10.

In addition, the expansion connector 20 and the external memory card connector 21 are connected to the input/output processor 31. The expansion connector 20 is a connector for such interface as USB or SCSI. The expansion connector 20, instead of the wireless communication module 18, is able to perform communications with a network by being connected to such a medium as external storage medium, a peripheral device, e.g., another controller, or a connector for wired communication. The external memory card connector 21 is a connector to be connected to an external storage medium such as a memory card. For example, the input/output processor 31 is able to access the external storage medium via the expansion connector 20 or external memory card connector 21 to store or read data from the external storage medium.

On the game apparatus body 5 (e.g., on a front main surface), a power button 24 of the game apparatus body 5, a reset button 25 for game processing, an insertion slot for mounting the optical disc 4 in a detachable manner, an eject button 26 for ejecting the optical disc 4 from the insertion slot of the game apparatus body 5, and the like are provided. The power button 24 and reset button 25 are connected to the system LSI 11. When the power button 24 is turned on, each component of the game apparatus body 5 is supplied with power via an AC adaptor which is not shown. When the reset button 25 is pressed, the system LSI 11 reexecutes the boot program of the game apparatus body 5. The eject button 26 is connected to the disc drive 14. When the eject button 26 is pressed, the optical disc 4 is ejected from the disc drive 14.

Figure 4:
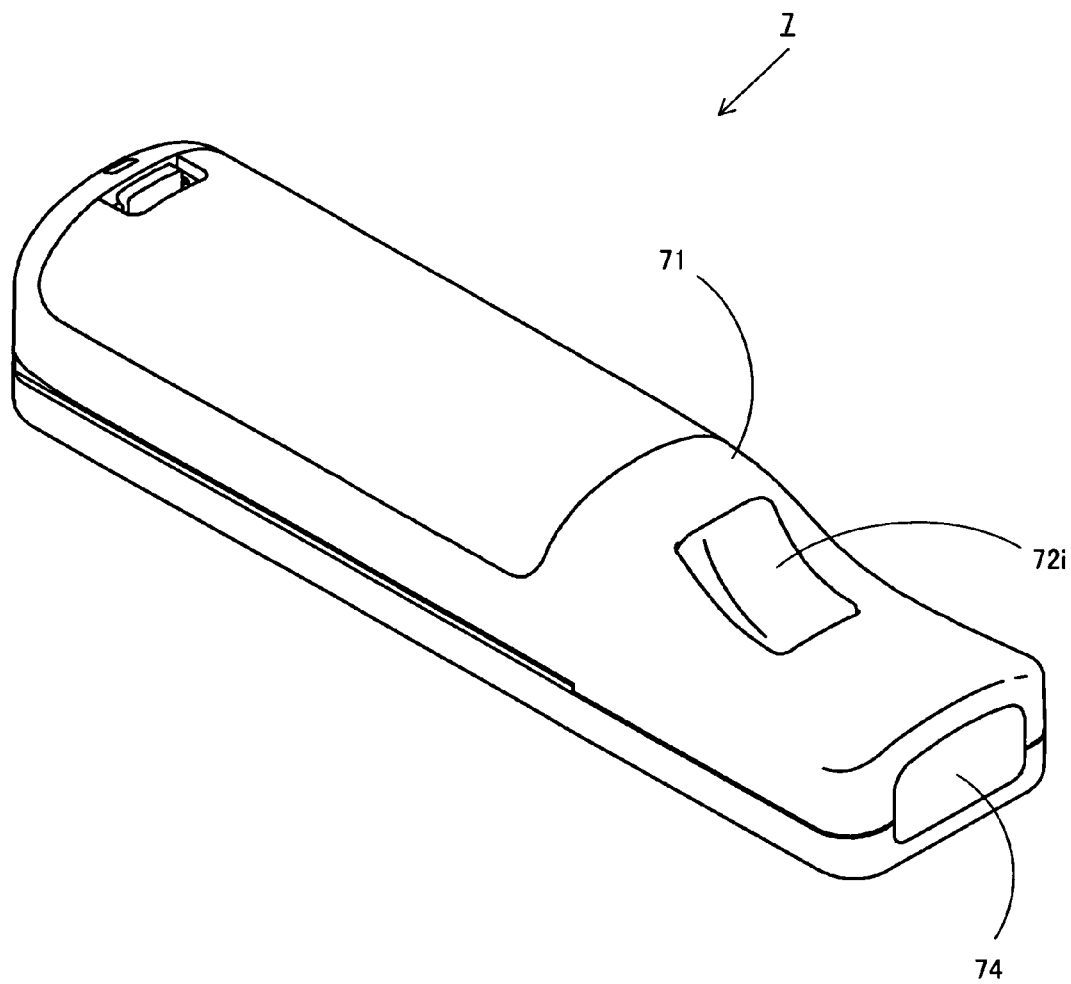
FIG. 4 is an isometric view of the controller 7 of FIG. 3, seen from a bottom front side thereof.

With reference to FIGS. 3 and 4, the controller 7 will be described. FIG. 3 is an isometric view of the controller 7 seen from a top rear side thereof. FIG. 4 is an isometric view of the controller 7 seen from a bottom front side thereof.

As shown in FIGS. 3 and 4, the controller 7 includes a housing 71 formed by plastic molding or the like. The housing 71 has a plurality of operation sections 72 provided thereon. The housing 71 has an approximately parallelepiped shape extending in a longitudinal direction from front to rear. The overall size of the housing 71 is small enough to be held by one hand of an adult or even a child.

At the center of a front part of a top surface of the housing 71, a cross key 72a is provided. The cross key 72a is a cross-shaped four-direction push switch. The cross key 72a includes operation portions corresponding to four directions (front, rear, right and left), which are respectively located on cross-shaped projecting portions arranged at intervals of 90 degrees. A player selects one of the front, rear, right and left directions by pressing one of the operation portions of the cross key 72a. Through an operation of the cross key 72a, the player can, for example, indicate a direction in which a player character or the like appearing in a virtual game world is to move, or give an instruction to select one of a plurality of options.

The cross key 72a is an operation section for outputting an operation signal in accordance with the above-described direction input operation performed by the player. Such an operation section may be provided in another form. For example, an operation section, which has four push switches arranged in crisscross directions and which is capable of outputting an operation signal in accordance with a push switch pressed by the player, may be provided. Alternatively, an operation section, which has a composite switch having, in addition to the above four push switches, a center switch at an intersection point of the above crisscross directions, may be provided. Still alternatively, the cross key 72a may be replaced with an operation section which includes an inclinable stick (so-called joy stick) projecting from a top surface of the housing 71 and which outputs an operation signal in accordance with an inclining direction of the stick. Still alternatively, the cross key 72a may be replaced with an operation section which includes a horizontally-slidable disc-shaped member and which outputs an operation signal in accordance with a sliding direction of the disc-shaped member. Still alternatively, the cross key 72a may be replaced with a touch pad.

Behind the cross key 72a on the top surface of the housing 71, a plurality of operation buttons 72b to 72g are provided. The operation buttons 72b to 72g are each an operation section for, when the player presses a head thereof, outputting a corresponding operation signal. For example, functions as a 1st button, 2nd button and A button are assigned to the operation buttons 72b to 72d. Also, functions as a minus button, home button and plus button are assigned to the operation buttons 72e to 72g, for example. Various operation functions are assigned to the operation buttons 72a to 72g in accordance with the game program executed by the game apparatus body 5. In an exemplary arrangement shown in FIG. 3, the operation buttons 72b to 72d are arranged in a line at the center in a front-rear direction on the top surface of the housing 71. The operation buttons 72e to 72g are arranged on the top surface of the housing 71 in a line in a left-right direction between the operation buttons 72b and 72d. The operation button 72f has a top surface thereof buried in the top surface of the housing 71, so as not to be inadvertently pressed by the player.

In front of the cross key 72a on the top surface of the housing 71, an operation button 72h is provided. The operation button 72h is a power switch for turning on and off the power to the game apparatus body 5 by remote control. The operation button 72h also has a top surface thereof buried in the top surface of the housing 71, so as not to be inadvertently pressed by the player.

Behind the operation button 72c on the top surface of the housing 71, a plurality of LEDs 702 are provided. Here, a controller type (number) is assigned to the controller 7 such that the controller 7 is distinguishable from the other controllers 7. The LEDs 702 are used for, e.g., informing the player of the controller type which is currently set for the controller 7. Specifically, a signal is transmitted from the wireless controller module 19 to the controller 7 such that one of the plurality of LEDs 702, which corresponds to the controller type of the controller 7, is lit up.

On the top surface of the housing 71, sound holes for outputting sounds from a later-described speaker (speaker 706 shown in FIG. 5) to the external space are formed between the operation button 72b and the operation buttons 72e to 72g.

On a bottom surface of the housing 71, a recessed portion is formed. The recessed portion on the bottom surface of the housing 71 is formed in a position in which an index finger or middle finger of the player is located when the player holds the controller 7 so as to point a front surface thereof to the markers 8L and 8R. On a slope surface of the recessed portion, an operation button 72i is provided. The operation button 72i is an operation section acting as, for example, a B button.

On a front surface of the housing 71, an image pickup element 743 forming a part of the imaging information calculation section 74 is provided. The imaging information calculation section 74 is a system for: analyzing image data of an image taken by the controller 7; identifying an area having a high brightness in the image; and detecting a position of a center of gravity, a size and the like of the area. The imaging information calculation section 74 has, for example, a maximum sampling period of approximately 200 frames/sec, and therefore can trace and analyze even a relatively fast motion of the controller 7. A configuration of the imaging information calculation section 74 will be described later in detail. On a rear surface of the housing 71, a connector 73 is provided. The connector 73 is, for example, an edge connector, and is used for engaging and connecting the controller 7 with a connection cable.

Figure 5:
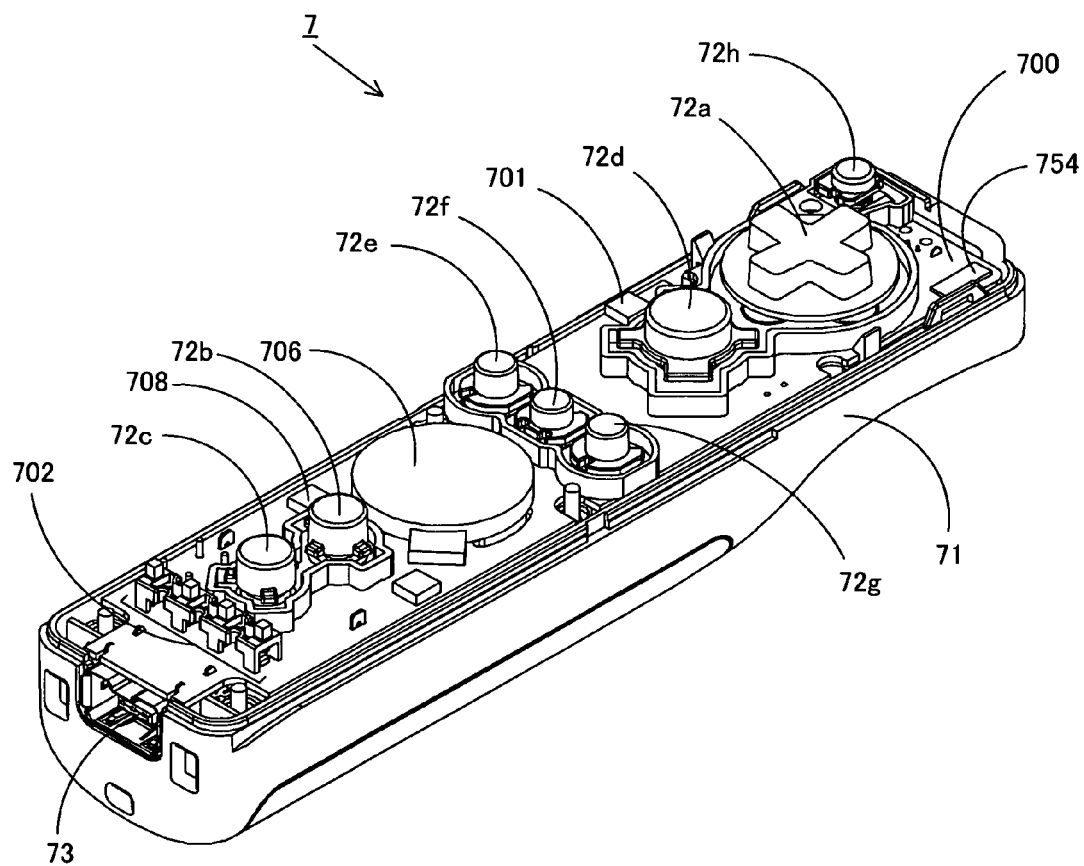
FIG. 5 is an isometric view illustrating a state where an upper casing of the controller 7 of FIG. 3 is removed.
Figure 6:
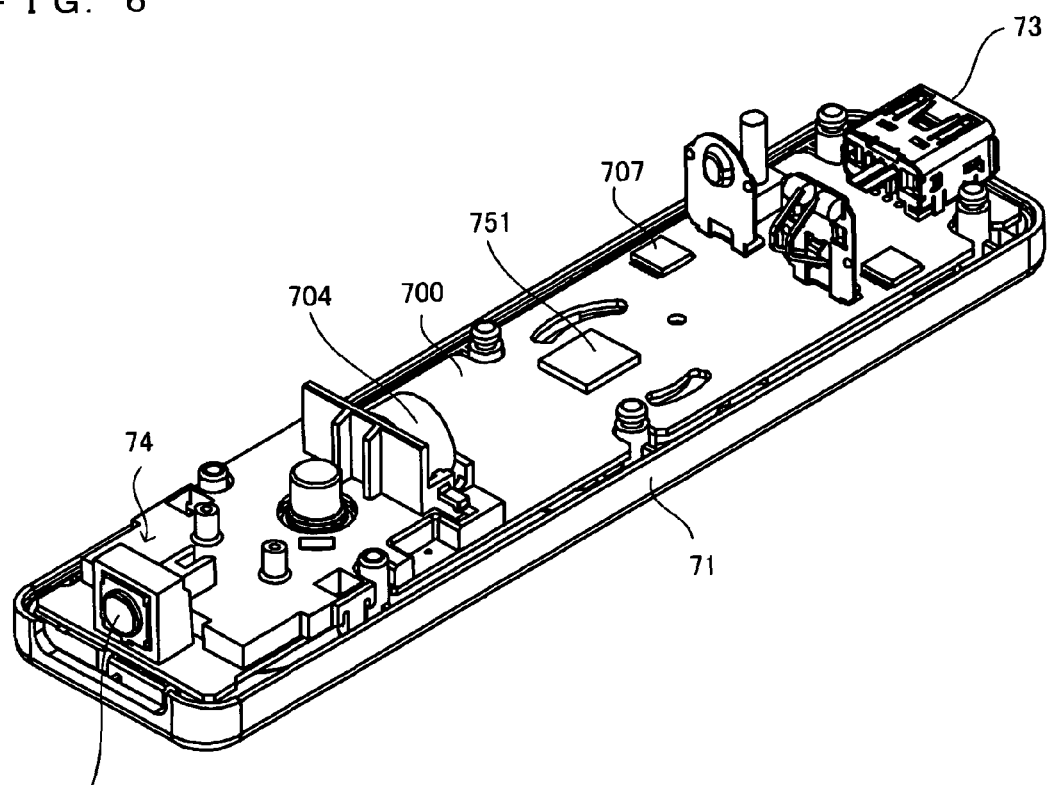
FIG. 6 is an isometric view illustrating a state where a lower casing of the controller 7 of FIG. 4 is removed.

Next, an internal structure of the controller 7 will be described with reference to FIGS. 5 and 6. FIG. 5 is an isometric view, seen from a rear surface side of the controller 7, illustrating a state where an upper casing (a part of the housing 71) of the controller 7 is removed. FIG. 6 is an isometric view, seen from a front surface side of the controller 7, illustrating a state where a lower casing (a part of the housing 71) of the controller 7 is removed. Here, FIG. 6 is an isometric view showing a reverse side of a substrate 700 shown in FIG. 5.

As shown in FIG. 5, the substrate 700 is fixed inside the housing 71. On a top main surface of the substrate 700, the operation buttons 72a to 72h, an acceleration sensor 701, the LEDs 702, an antenna 754 and the like are provided. These elements are connected to, e.g., a microcomputer 751 (see FIGS. 6 and 7) by wirings (not shown) formed on the substrate 700 and the like. The wireless module 753 (see FIG. 7) and antenna 754 allow the controller 7 to act as a wireless controller. Inside the housing 71, a quartz oscillator, which is not shown, is provided, and the quarts oscillator generates a reference clock of the later-described microcomputer 751. Further, the speaker 706 and an amplifier 708 are provided on the top main surface of the substrate 700.

The acceleration sensor 701 is provided, on the substrate 700, to the left side of the operation button 72d (i.e., provided not on a central portion but on a peripheral portion of the substrate 700). For this reason, in response to the controller 7 having rotated around an axis of a longitudinal direction of the controller 7, the acceleration sensor 701 is able to detect, in addition to a change in direction of gravitational acceleration, an acceleration containing centrifugal components, and the game apparatus body 5 or the like is able to determine, based on detected acceleration data, a motion of the controller 7 by a predetermined calculation with a favorable sensitivity. For example, the controller 7 has a three-axis acceleration sensor 701. The three-axis acceleration sensor 701 is able to detect linear acceleration of the controller 7 for three axial directions of the controller 7, i.e., an up-down direction, a left-right direction, and a front-rear direction. Data indicating the acceleration detected by the acceleration sensor 701 is outputted to the communication section 75.

As shown in FIG. 6, at a front edge of a bottom main surface of the substrate 700, the imaging information calculation section 74 is provided. The imaging information calculation section 74 comprises an infrared filter 741, a lens 742, the image pickup element 743 and an image processing circuit 744 which are located in said order from the front surface of the controller 7. These elements are attached to the bottom main surface of the substrate 700. At a rear edge of the bottom main surface of the substrate 700, the connector 73 is attached. Further, a sound IC 707 and the microcomputer 751 are provided on the bottom main surface of the substrate 700. The sound IC 707 is connected to the microcomputer 751 and amplifier 708 by wirings formed on the substrate 700 and the like, and outputs audio signals via the amplifier 708 to the speaker 706 in response to sound data transmitted from the game apparatus body 5.

On the bottom main surface of the substrate 700, a vibrator 704 is attached. The vibrator 704 may be, for example, a vibration motor or a solenoid. The vibrator 704 is connected to the microcomputer 751 by wirings formed on the substrate 700 and the like, and is activated or deactivated in response to vibration data transmitted from the game apparatus body 5. The controller 7 is vibrated by an actuation of the vibrator 704, and the vibration is conveyed to the player's hand holding the controller 7. Thus, a so-called vibration-feedback game is realized. Since the vibrator 704 is provided at a relatively forward position in the housing 71, the housing 71 held by the player significantly vibrates, and allows the player to clearly feel the vibration.

Next, an internal configuration of the controller 7 will be described with reference to FIG. 7. FIG. 7 is a block diagram showing the configuration of the controller 7.

As shown in FIG. 7, in addition to the above-described operation sections 72, imaging information calculation section 74, acceleration sensor 701, vibrator 704, speaker 706, sound IC 707 and the amplifier 708, the controller 7 includes the communication section 75.

The imaging information calculation section 74 includes the infrared filter 741, lens 742, image pickup element 743 and the image processing circuit 744. The infrared filter 741 allows, among lights incident thereon through the front surface of the controller 7, only an infrared light to pass therethrough. The lens 742 converges the infrared light which has passed through the infrared filter 741, and outputs the infrared light to the image pickup element 743. The image pickup element 743 is a solid-state image pickup element such as a CMOS sensor or a CCD. The image pickup element 743 takes an image of the infrared light collected by the lens 742. In other words, the image pickup element 743 takes an image of only the infrared light which has passed through the infrared filter 741. Then, the image pickup element 743 generates image data of the image. The image data generated by the image pickup element 743 is processed by the image processing circuit 744. Specifically, the image processing circuit 744 processes the image data obtained from the image pickup element 743, detects an area of the image, which area has a high brightness, and outputs, to the communication section 75, process result data indicating, e.g., position coordinates, square measure and the like detected from the area. The imaging information calculation section 74 is fixed to the housing 71 of the controller 7. An imaging direction of the imaging information calculation section 74 can be changed by changing a facing direction of the housing 71.

The communication section 75 includes the microcomputer 751, a memory 752, the wireless module 753 and the antenna 754. The microcomputer 751 controls the wireless module 753 for wirelessly transmitting transmission data while using the memory 752 as a storage area during processing. The microcomputer 751 also controls operations of the sound IC 707 and vibrator 704 in accordance with data which the wireless module 753 has received from the game apparatus body 5 via the antenna 754. The sound IC 707 processes sound data or the like transmitted from the game apparatus body 5 via the communication section 75. Further, the microcomputer 751 activates the vibrator 704 in accordance with vibration data or the like (e.g., a signal for causing the vibrator 704 to be ON or OFF) which is transmitted from the game apparatus body 5 via the communication section 75.

Data from the controller 7 such as operation signals (key data) from the operation sections 72, acceleration signals (acceleration data) from the acceleration sensor 701 with respect to the three axial directions, and the process result data from the imaging information calculation section 74 are outputted to the microcomputer 751. The microcomputer 751 temporarily stores inputted data (the key data, acceleration data and process result data) in the memory 752 as transmission data to be transmitted to the wireless controller module 19. Here, radio transmission from the communication section 75 to the wireless controller module 19 is performed at predetermined time intervals. Since the game processing is generally performed at a cycle of 1/60 sec, the radio transmission needs to be performed at a cycle of a shorter time period. Specifically, the game processing is performed at a cycle of 16.7 ms (1/60 sec), and a transmission interval of the communication section 75 structured using the Bluetooth (registered trademark) technology is 5 ms. At a timing of performing a transmission to the wireless controller module 19, the microcomputer 751 outputs, to the wireless module 753, the transmission data stored in the memory 752 as a series of pieces of operation information. The wireless module 753 uses, for example, the Bluetooth (registered trademark) technology to radiate, with a carrier wave having a predetermined frequency, a radio signal from the antenna 754, the radio signal indicating the series of pieces of operation information. Thus, the key data from the operation sections 72, the acceleration data from the acceleration sensor 701, and the process result data from the imaging information calculation section 74 are transmitted from the controller 7. The wireless controller module 19 of the game apparatus body 5 receives the radio signal, and the game apparatus body 5 demodulates or decodes the radio signal to obtain the series of pieces of operation information (the key data, acceleration data and process result data). In accordance with the series of pieces of obtained operation information and the game program, the CPU 10 of the game apparatus body 5 performs game processing. In the case where the communication section 75 is structured using the Bluetooth (registered trademark) technology, the communication section 75 can have a function of receiving transmission data wirelessly transmitted from other devices.

Figure 9:
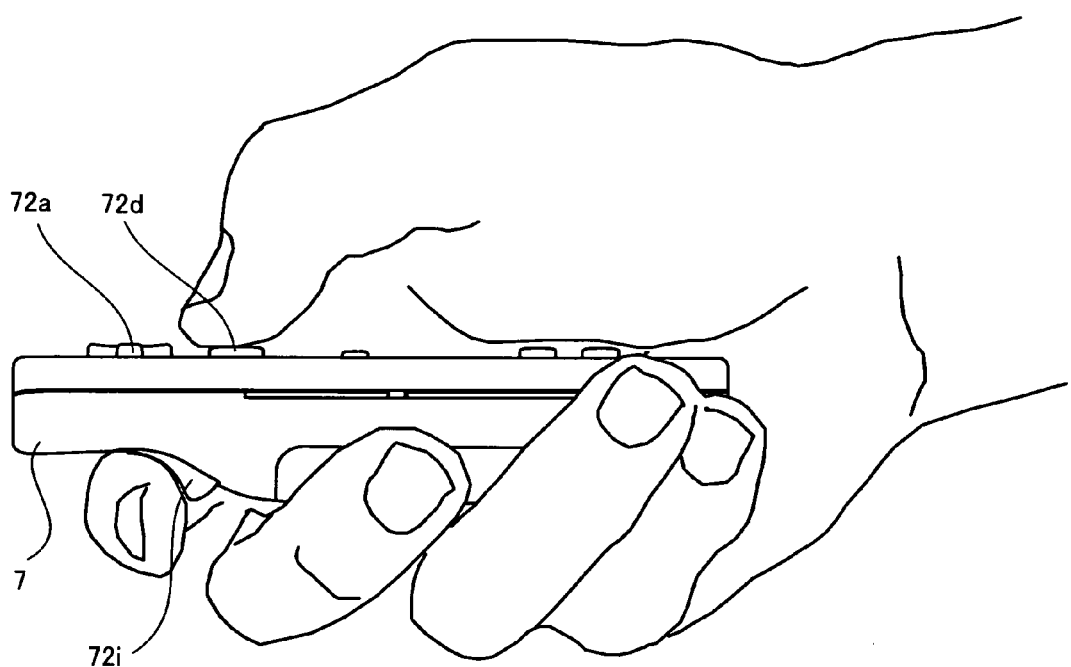
FIG. 9 shows an exemplary state of the player holding the controller 7 with his/her right hand as seen from a left side of the controller 7.

With reference to FIGS. 8 and 9, a state of a player holding the controller 7 with one hand will be described. FIG. 8 shows an exemplary state of the player holding the controller 7 with his/her right hand as seen from a front surface side of the controller 7. FIG. 9 shows an exemplary state of the player holding the controller 7 with his/her right hand as seen from a left side of the controller 7.

As shown in FIGS. 8 and 9, the overall size of the controller 7 is small enough to be held by one hand of an adult or even a child. When the player puts his/her thumb on the top surface of the controller 7 (for example, near the cross key 72a), and puts his/her index finger in the recessed portion on the bottom surface of the controller 7 (for example, near the operation button 72i), a light entrance of the imaging information calculation section 74 on the front surface of the controller 7 is exposed forward from the player. It should be understood that also when the player holds the controller 7 with his/her left hand, the holding state is the same as that described for the right hand.

Thus, the controller 7 allows the player to easily operate the operation sections 72 such as the cross key 72a and the operation button 72i while holding the controller 7 with one hand. Further, when the player holds the controller 7 with one hand, the light entrance of the imaging information calculation section 74 on the front surface of the controller 7 is exposed, whereby the light entrance can easily receive the infrared lights from the aforementioned two markers 8L and 8R. As a result, the player can hold the controller 7 with one hand without preventing the imaging information calculation section 74 of the controller 7 from functioning. That is, when the player moves his/her hand holding the controller 7 with respect to the display screen, the controller 7 can perform an operation input by which a motion of the player's hand directly affects a display on the display screen.

As described above, in order to play a game with the game system 1 by using the controller 7, the player holds the controller 7 with one hand (e.g., right hand). Here, the player holds the controller 7 such that the front surface of the controller 7 (the entrance of a light whose image is taken by the imaging information calculation section 74) faces the monitor 2. The two markers 8L and 8R are provided in the vicinity of the display screen of the monitor 2 (see FIG. 1). These markers 8L and 8R each output an infrared light forward from the monitor 2, and an image of these infrared lights is taken by the imaging information calculation section 74.

Figure 10:
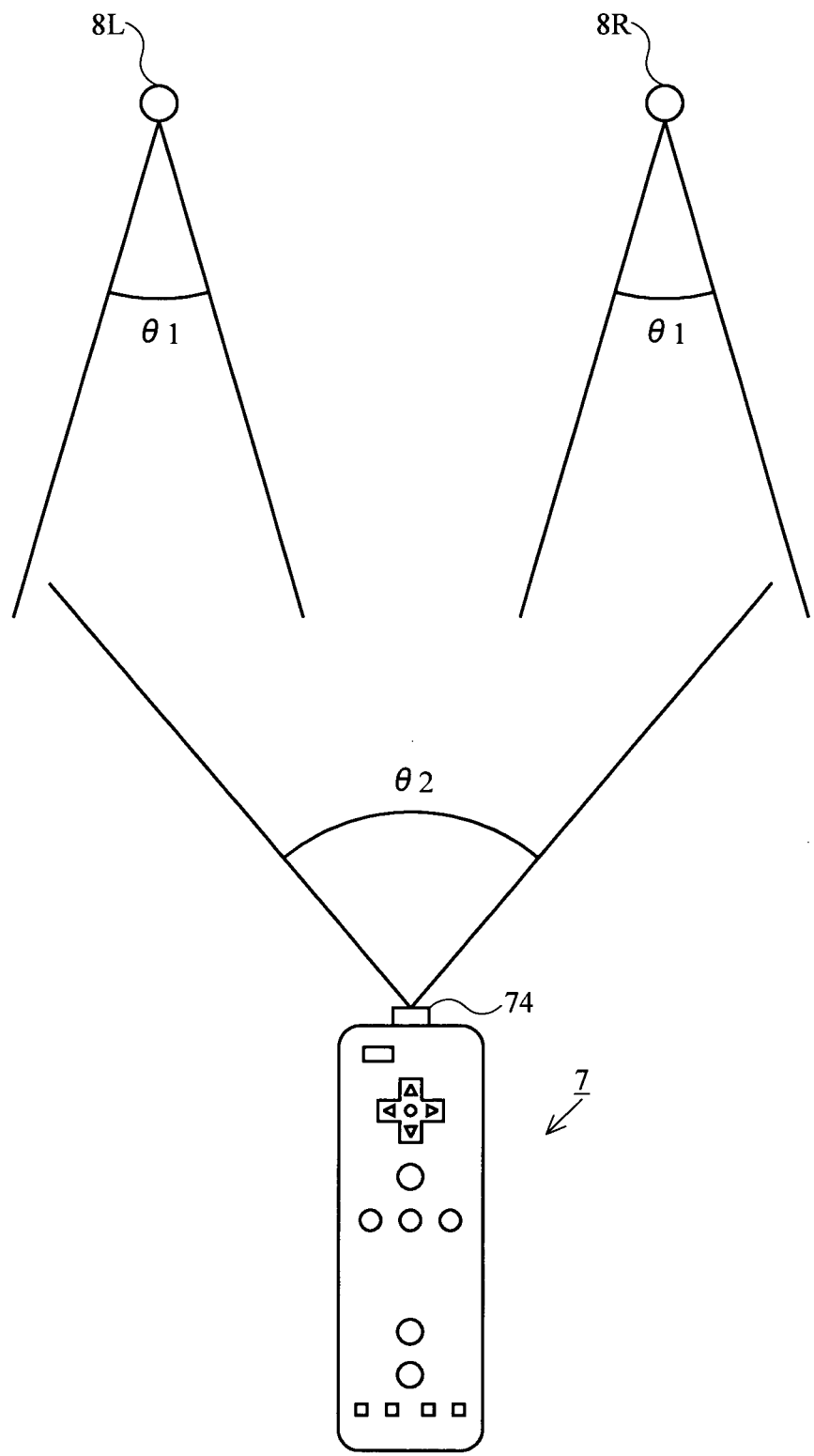
FIG. 10 illustrates a viewing angle between an imaging information calculation section 74 and markers 8L and 8R.

As shown in FIG. 10, the markers 8L and 8R each have a viewing angle θ1. The image pickup element 743 has a viewing angle θ2. For example, each of the viewing angles θ1 of the markers 8L and 8R is 34 degrees (half-value angle), and the viewing angle θ2 of the image pickup element 743 is 41 degrees. When both the markers 8L and 8R are present in the viewing angle θ2 of the image pickup element 743, and the image pickup element 743 is present in the viewing angle θ1 of the marker 8L and the viewing angle θ1 of the marker 8R, the game apparatus body 5 calculates a position of the controller 7 (including the distance between the controller 7 and the markers 8L and 8R) by using positional data about points on the two markers 8L and 8R, the points each having a high brightness.

When the player holds the controller 7 so as to point the front surface thereof to the monitor 2, the infrared lights outputted from the two markers 8L and 8R are incident on the imaging information calculation section 74. The image pickup element 743 takes an image of the infrared lights which are incident on the image pickup element 743 through the infrared filter 741 and the lens 742, and the image processing circuit 744 processes the taken image. The imaging information calculation section 74 detects, from the taken image, infrared components outputted by the markers 8L and 8R so as to obtain positional information about the markers 8L and 8R (i.e., positions of target images) in the taken image and size information about the markers 8L and 8R such as a square measure, diameter and width thereof. Specifically, the image processing circuit 744 analyzes image data of the image taken by the image pickup element 743, and eliminates, from the taken image, an image which does not contain the infrared lights outputted by the markers 8L and 8R, and then identifies points each having a high brightness as positions of the markers 8L and 8R. The imaging information calculation section 74 obtains positional information which is information about a brightness position such as the center of gravity of each of the identified points having a high brightness, and outputs the positional information as the process result data. Here, the positional information outputted as the process result data may be coordinate values indicating the brightness position, which are obtained by setting a predetermined reference point (for example, the center or the upper left corner of the taken image) in the taken image as a coordinate origin. Alternatively, the brightness position which is previously identified at a predetermined timing may be set as a reference point, and a vector indicating a positional difference between the reference point and the brightness position currently identified may be outputted as the process result data. That is, in the case where a predetermined reference point is set in the image taken by the image pickup element 743, the positional information about each of the target images in the taken image is a parameter indicating a positional difference from the predetermined reference point. When such positional information is transmitted to the game apparatus body 5, the game apparatus body 5 can obtain, based on a positional difference between the reference point and the positional information about each of the target images, an amount by which a signal changes in accordance with a motion, orientation, position and the like of the imaging information calculation section 74 (i.e., the controller 7) with respect to the markers 8L and 8R. Specifically, the position of each point having a high brightness in the taken image, which is transmitted from the communication section 75, is changed in accordance with the motion of the controller 7, and a direction or coordinates corresponding to such a change of the position of each point having a high brightness is transmitted from the communication section 75. Upon receiving the direction or coordinates from the communication section 75, the game apparatus boy 5 recognizes and uses the direction or coordinates as an input from the communication section 75, which input corresponds to a moving direction of the controller 7 in a three-dimensional space. In exemplary game processing described later, the imaging information calculation section 74 obtains at least coordinates of the center of gravity of a point having a high brightness for each of the target images of the markers 8L and 8R in the taken image, and outputs the coordinates as the process result data.

Thus, the imaging information calculation section 74 of the controller 7 takes an image of the stationary markers (infrared lights from the two markers 8L and 8R in the present embodiment), and the game apparatus body 5 processes data outputted by the controller 7 during the game processing. This enables an operation input to be performed in accordance with the motion, orientation, position and the like of the controller 7. Therefore, the operation input, which is different from an operation input made by pressing an operation button or using an operation key, is intuitively performed. As described above, since the markers are provided in the vicinity of the display screen of the monitor 2, the motion, orientation, position and the like of the controller 7 with respect to the display screen of the monitor 2 can be easily calculated based on a position of the controller 7 with respect to the markers. That is, the process result data based on the motion, orientation, position and the like of the controller 7 can be used as an operation input which directly affects a display on the display screen of the monitor 2. Note that, in the game system 1, the distance between the controller 7 and the markers 8L and 8R, which is obtained by using the taken image of the markers 8L and 8R, can also be used as an operation input which directly affects a display on the display screen of the monitor 2. This will be described later in detail.

Figure 11:
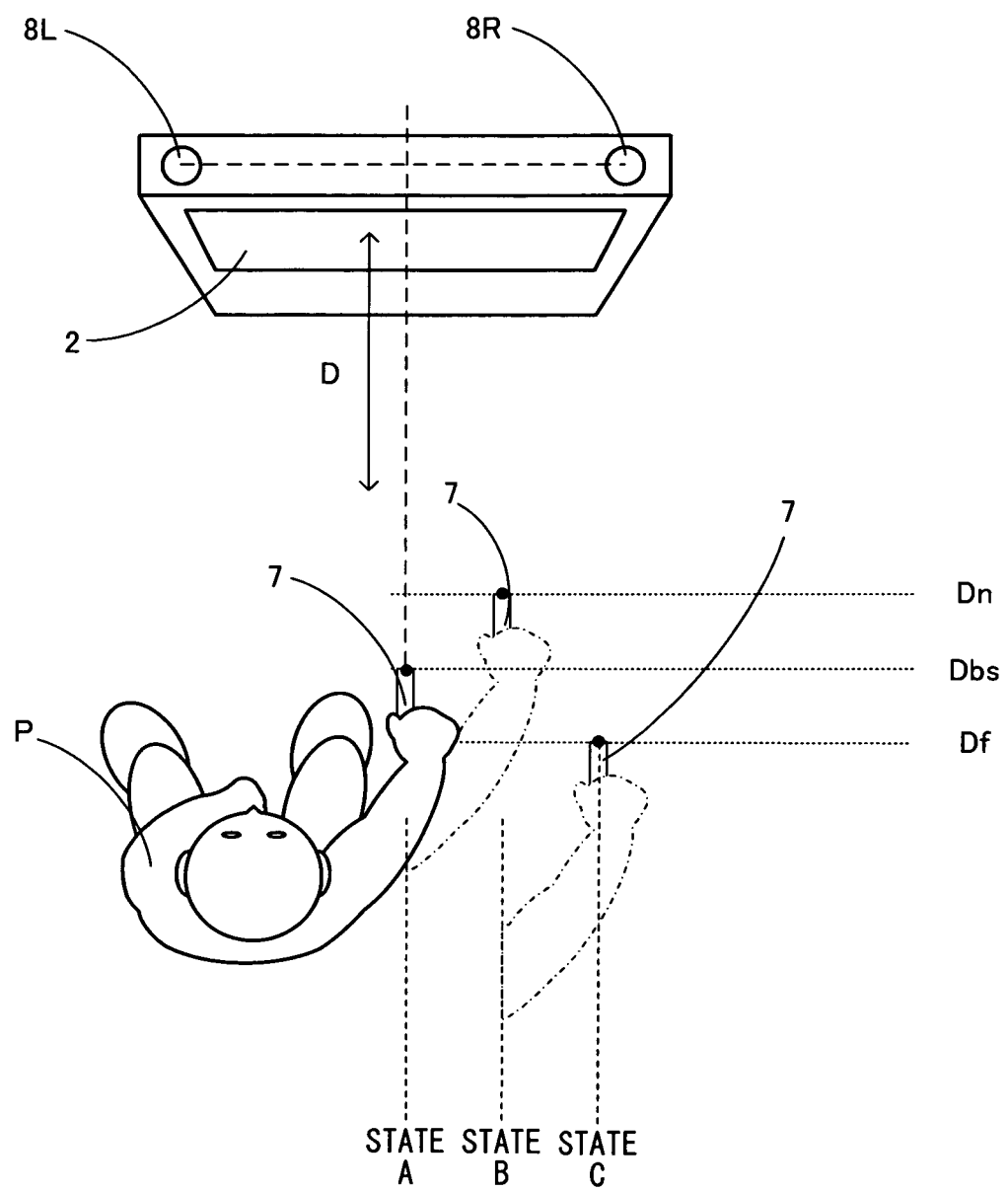
FIG. 11 is a top view showing an example in which a player P operates the controller 7 in a front-rear direction with respect to the markers 8L and 8R.
Figure 12:
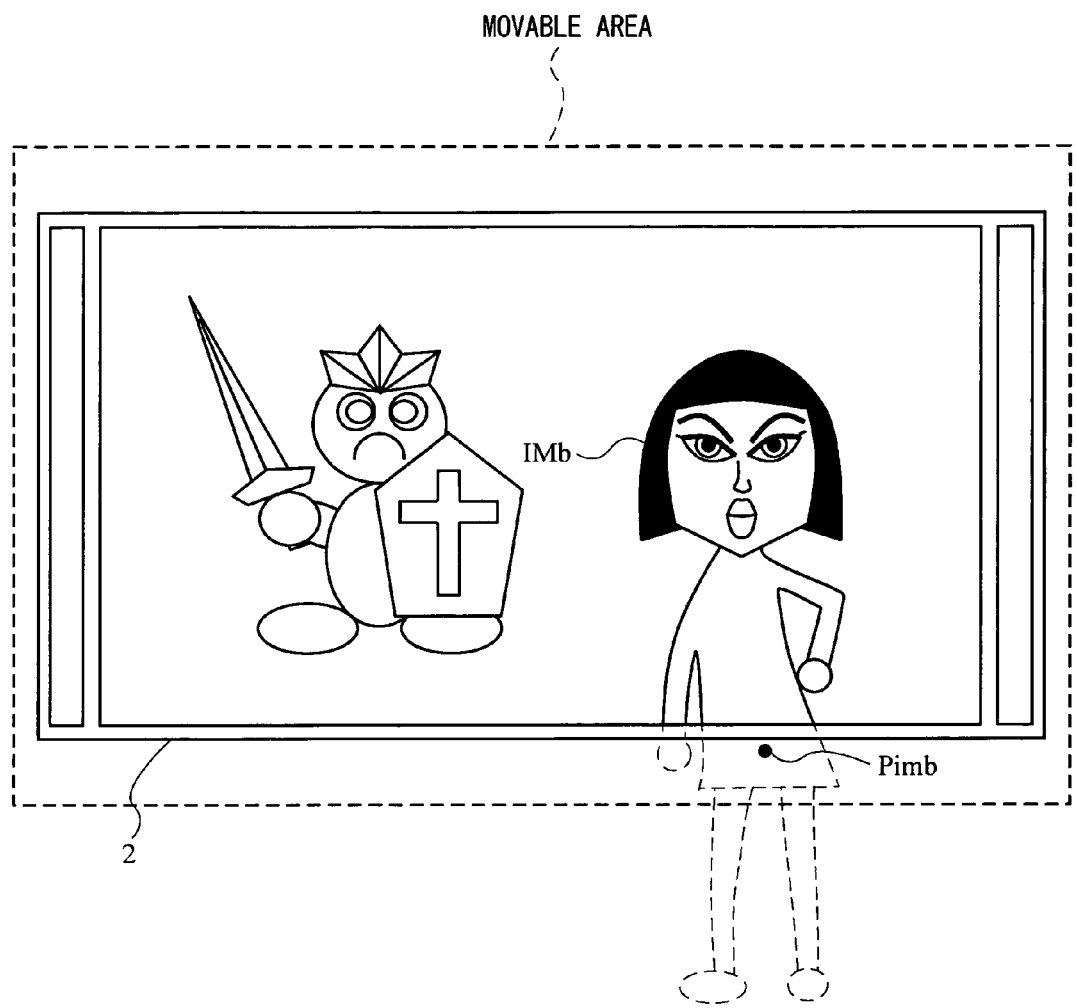
FIG. 12 is an exemplary screen display which is provided on the monitor 2 in response to the operation shown in FIG. 11.

Next, an exemplary image, which is displayed on the monitor 2 in accordance with an operation performed by a player P, will be described with reference to FIGS. 11 to 13. FIG. 11 is a top view showing an example in which the player P operates the controller 7 in a front-rear direction with respect to the markers 8L and 8R. FIGS. 12 and 13 show exemplary displays which are provided on the monitor 2 in accordance with the operations, shown in FIG. 11, performed by the player P.

In FIG. 11, the player P holds the controller 7 so as to point the front surface of the controller 7 to the markers 8L and 8R (i.e., to the monitor 2). Here, a distance between the front surface of the controller 7 (to be exact, the image pickup element 743) and a middle point between the markers 8L and 8R is referred to as a "distance D". In a state A shown in FIG. 11, the player P holds the controller 7 such that the distance D is a distance Dbs (i.e., later-described reference distance Dbs). The player P can change the distance D, which is the distance between the front surface of the controller 7 and the middle point between the markers 8L and 8R, by moving the controller 7 back and forth with respect to the monitor 2. For example, the player P may move the controller 7 forward to the monitor 2, such that the distance D changes from Dbs to Dn (state B). Also, the player P may move the controller 7 backward from the monitor 2, such that the distance D changes from Dbs to Df (state C).

FIG. 12 is an exemplary screen display which is provided on the monitor 2 in the case of the above state B. As shown in FIG. 12, the monitor 2 displays, in the state B, a part of an image IMb which is superimposed on an background image. Here, the image IMb is a character image which moves and/or rotates within an display area of the monitor 2 in response to the controller 7 pointing a particular position and/or in response to an orientation of the controller 7. The image IMb displayed on the monitor 2 in the state B is larger in size than the image IMb displayed in the state A. In other words, by moving the controller 7 toward the monitor 2, the player P can enlarge the character image (image IMb) displayed on the monitor 2. Moreover, by moving the controller 7 from side to side and up and down with respect to the monitor 2 and/or twisting the controller 7 to the right and left with respect to the monitor 2, the player P can move and/or rotate the image IMb displayed on the monitor 2. In FIG. 12, a position of the image IMb, which is set in accordance with a position which the player P points with the controller 7, is shown as an image position Pimb.

FIG. 13 is an exemplary screen display which is provided on the monitor 2 in the case of the above state C. As shown in FIG. 13, the monitor 2 displays, in the state C, an image IMs which is superimposed on an background image. Similarly to the image IMb, the image IMs is a character image which moves and/or rotates within the display area of the monitor 2 in response to the controller 7 pointing a particular position and/or in response to an orientation of the controller 7. The image IMs displayed on the monitor 2 in the state C is smaller in size than the image IMs displayed in the state A, or than the image IMb shown in FIG. 12. In other words, by moving the controller 7 away from the monitor 2, the player P can reduce, in size, the character image (image IMs) displayed on the monitor 2. Moreover, similarly to the image IMb, by moving the controller 7 from side to side and up and down with respect to the monitor 2 and/or twisting the controller 7 to the right and left with respect to the monitor 2, the player P can move and/or rotate the image IMs displayed on the monitor 2. In FIG. 13, a position of the image IMs, which is set in accordance with a position which the player P points with the controller 7, is shown as an image position Pims.

As is clear from a comparison of FIGS. 12 and 13, areas within which the image IMb and image IMs can be respectively moved (hereinafter, these areas are each referred to as a movable area) are set to have different sizes from each other. Here, the movable areas of the image IMb and image IMs are areas within which the image positions Pimb and Pims can be set, respectively. To be specific, a relatively large movable area is set for the image IMb which is enlarged in display. In the example of FIG. 12, a larger movable area than the display area of the monitor 2 is set. Also, a relatively small movable area is set for the image IMs which is reduced in display. In the example of FIG. 13, a smaller movable area than the display area of the monitor 2 is set. By setting the movable area, as described above, in accordance with an enlargement ratio of the image IM, it is prevented that the size of the movable area becomes insufficient when the image IMb has a relatively high enlargement ratio, and that the image IMs having a relatively small enlargement ratio disappears from the display area when the image IMs moves. As a result, the movement of the image IM can be properly controlled.

A moving speed of the image IM, which moves in response to the player P having moved the controller 7 from side to side and up and down with respect to the monitor 2, is changed in accordance with the aforementioned distance D. To be more specific, in the state B, i.e., in the case where the player operates the controller 7 near the monitor 2, the moving speed of the image IM is relatively fast when the position pointed by the controller 7 is moved. On the other hand, in the state C, i.e., in the case where the player operates controller 7 at a remote position from the monitor 2, the moving speed of the image IM is relatively slow when the position pointed by the controller 7 is moved.

Figure 14:
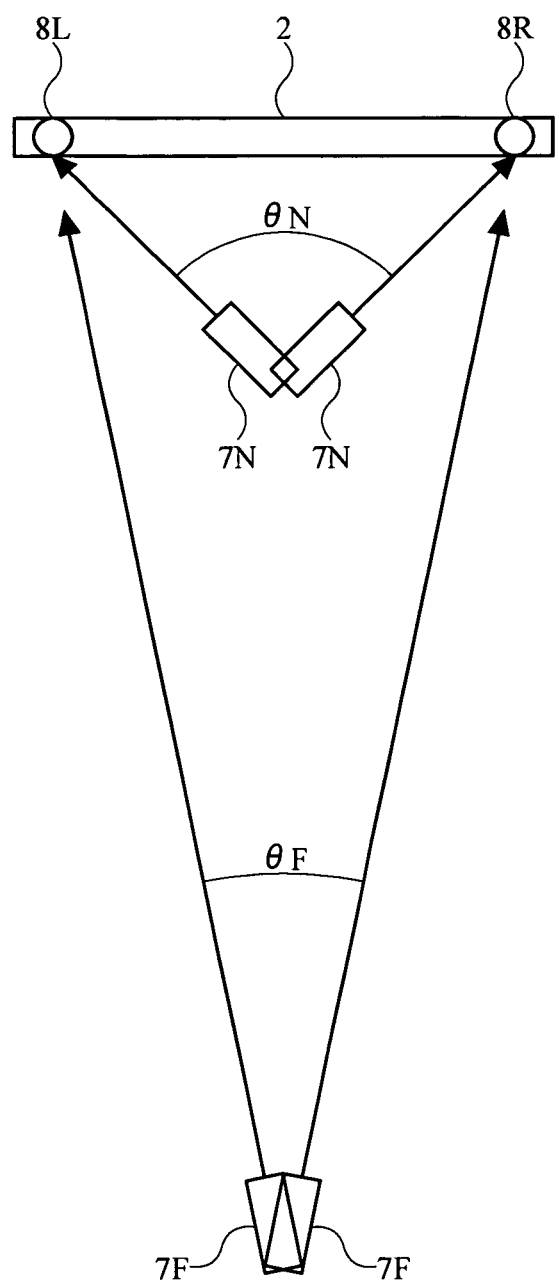
FIG. 14 shows operation angles in the case where the player P points both ends of a display screen of the monitor 2 by using the controller 7.

Here, even if the player P moves the controller 7 from side to side at a same angle, a position pointed by the controller 7 varies in accordance with a distance from the monitor 2 to the controller 7. For example, as shown in FIG. 14, when the player P is positioned near the monitor 2, the player P is required to move a controller 7N by an angle θN in order to point both ends of the display screen with the controller 7N. Whereas, when the player P is positioned at a remote position from the monitor 2, the player P is required to move a controller 7F by an angle θF in order to point the both ends of the display screen with the controller 7F. When these two situations are compared, an operation angle θN is greater than an operation angle θF as shown in FIG. 14. In other words, when the player P near the monitor 2 points the monitor 2 with the controller 7, the player P is required to increase an angle by which to move the controller 7, as compared to a case where the player P operates the controller 7 at a remote position from the monitor 2. In order to reduce such a difference in operability which is affected by a change in the distance D, a moving amount, of the image position Pim which is set based on a position pointed by the controller 7, is changed in accordance with the distance D. Note that, the image position Pim of the image IM, which is set based on the position pointed by the controller 7, is a placement position of the present invention.

Figure 15:
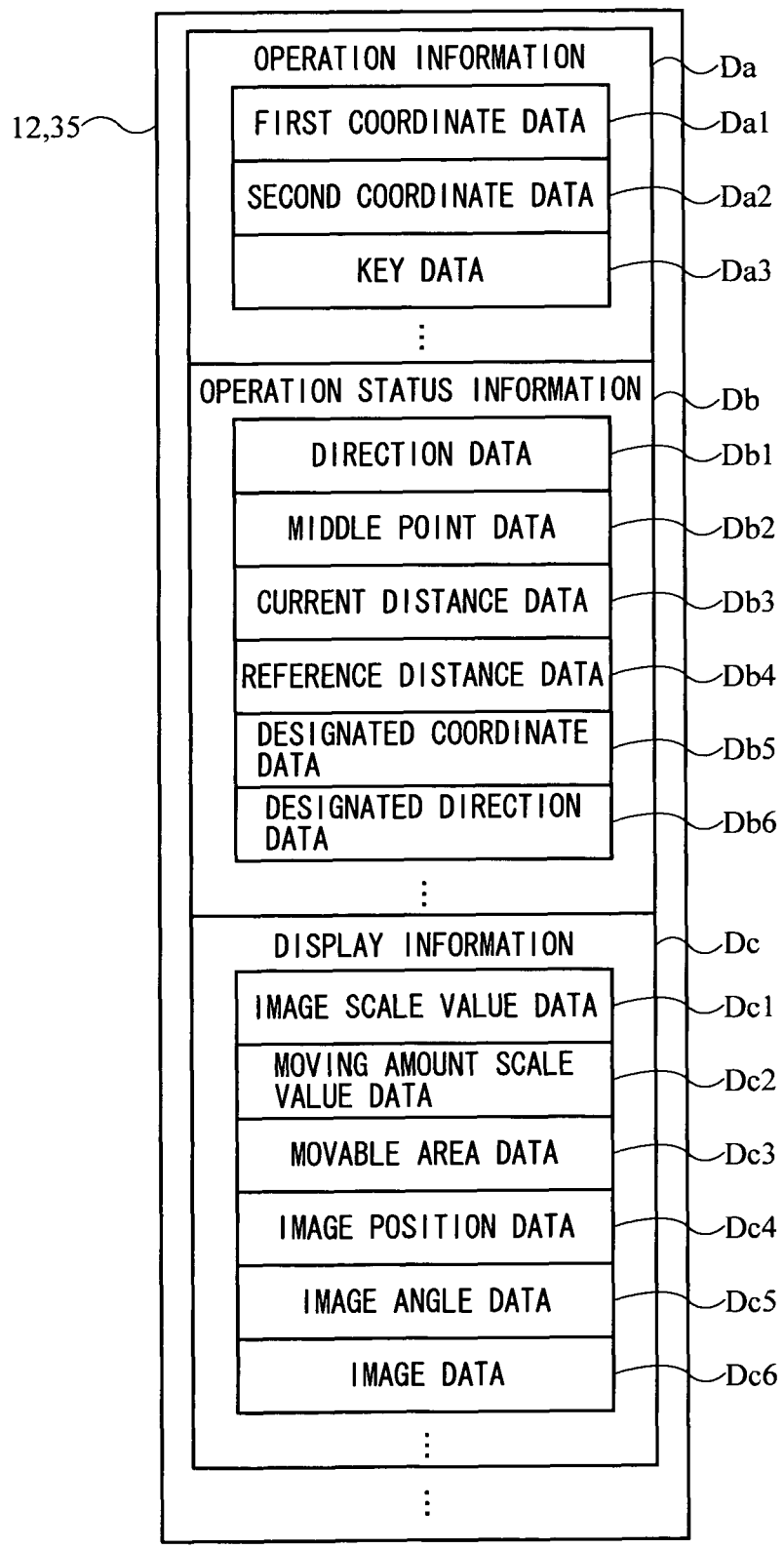
FIG. 15 shows an example of main data stored in a main memory of the game apparatus body 5.

Next, the game processing performed by the game system 1 will be described in detail. First, main data used for the game processing will be described with reference to FIG. 15. FIG. 15 shows an example of the main data to be stored in the external main memory 12 and/or internal main memory 35 of the game apparatus body 5 (hereinafter, these two main memories are collectively referred to as a main memory).

As shown in FIG. 15, the main memory 33 stores operation information Da, operation status information Db, display information Dc and so on. In addition to data contained in the information shown in FIG. 15, the main memory 33 stores, as necessary, other data used for the game processing.

The operation information Da contains the series of pieces of operation information (key data, acceleration data and process result data) which are transmitted as transmission data from the controller 7. The operation information Da is information to be updated to latest operation information. The operation information Da contains first coordinate data Da1 and second coordinate data Da2 which correspond to the positional information of the above-described process result data. For the image taken by the image pickup element 743, the first coordinate data Da1 indicates a position (position in the taken image) of one of the images of the two markers 8L and 8R, and the second coordinate data Da2 indicates a position (position in the taken image) of the other of the images of the two markers 8L and 8R. The positions of the images of the markers in the taken image are specified, for example, in a XY coordinate system on the taken image.

The operation information Da contains, in addition to the coordinate data (the first coordinate data Da1 and second coordinate data Da2) which is exemplary process result data obtained from the taken image, key data Da3 and the like obtained from the operation sections 72. Note that, the wireless controller module 19 of the game apparatus body 5 receives the series of pieces of operation information transmitted from the controller 7 at predetermined time intervals, e.g., every 5 ms, and stores the operation information in a buffer (not shown) of the wireless controller module 19. Thereafter, most recently stored operation information in the buffer is read every frame (e.g., every 1/60 sec) which is a game processing interval, and the operation information Da of the main memory is updated.

The operation status information Db contains information about an operation status of the controller 7, which operation status is determined based on the taken image. The operation status information Db contains data which is obtained from, e.g., positions and directions of the target images (markers) contained in the taken image. To be specific, the operation status information Db contains direction data Db1, middle point data Db2, current distance data Db3, reference distance data Db4, designated coordinate data Db5, designated direction data Db6 and so on. The direction data Db1 indicates a direction from a point indicated by the first coordinate data Da1 to a point indicated by the second coordinate data Da2. It is assumed here that the direction data Db1 is a vector whose originating point is the point indicated by the first coordinate data Da1 and whose ending point is the point indicated by the second coordinate data Da2. The middle point data Db2 indicates coordinates of a middle point between the point indicated by the first coordinate data Da1 and the point indicated by the second coordinate data Da2. When the images of the two markers (markers 8L and 8R) are seen as a single target image, the middle point data Db2 indicates a position of the single target image in the taken image. The current distance data Db3 indicates the current distance D between the controller 7 and the markers 8L and 8R and which is calculated based on the first coordinate data Da1 and second coordinate data Da2. The reference distance data Db4 indicates the distance D, which is a distance between the controller 7 and the markers 8L and 8R and which is obtained at a predetermined timing (e.g., a timing at which a later-described process starts), as the reference distance Dbs. The designated coordinate data Db5 indicates a designated position in a virtual game space (Xt, Yt, Zt), which is designated by the controller 7. The designated direction data Db6 indicates a designated direction in the virtual game space, which is set based on an orientation of the controller 7 (e.g., angle of a twisting direction).

The display information Dc contains image scale value data Dc1, moving amount scale value data Dc2, movable area data Dc3, image position data Dc4, image angle data Dc5, image data DC6, and the like. The image scale value data Dc1 indicates scale values (Sx, Sy) of the image IM, which are set based on the distance D and reference distance Dbs. The moving amount scale value data Dc2 indicates scale values (STx, STy) of a moving amount of the image IM, which are set based on the scale values (Sx, Sy). The movable area data Dc3 indicates an area within the virtual game space, in which area an image position Pim is placeable. The image position data Dc4 indicates coordinates of the image position Pim (Xans, Yans, Zans) in the virtual game space. The image angle data Dc5 indicates an image angle Aim which is used when the image IM is placed in the virtual game space. The image data Dc6 is image data for displaying the image IM, a background image and the like on a display device (monitor 2).

Figure 16:
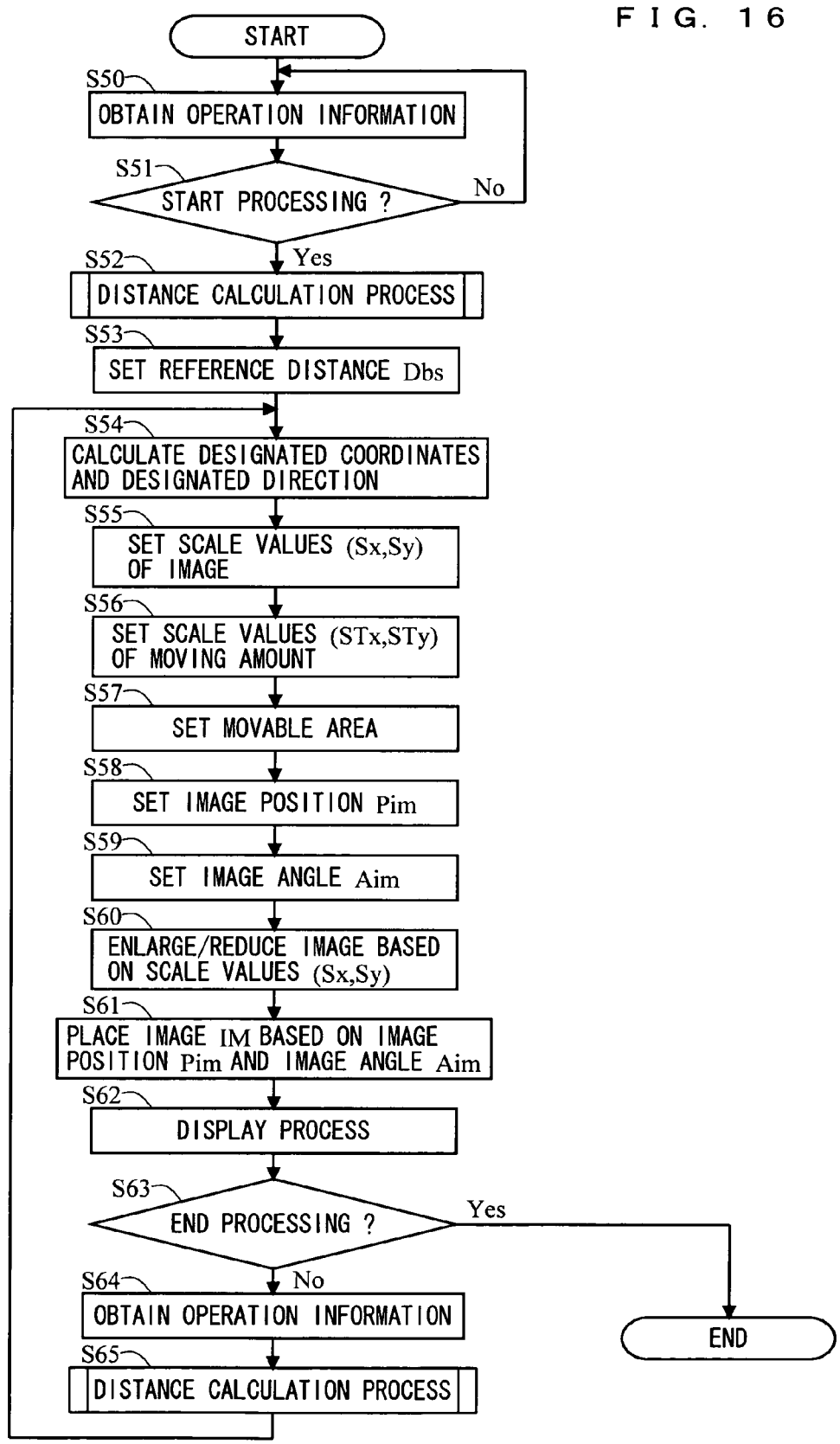
FIG. 16 is a flowchart showing a flow of image processing performed by the game apparatus body 5.
Figure 19:
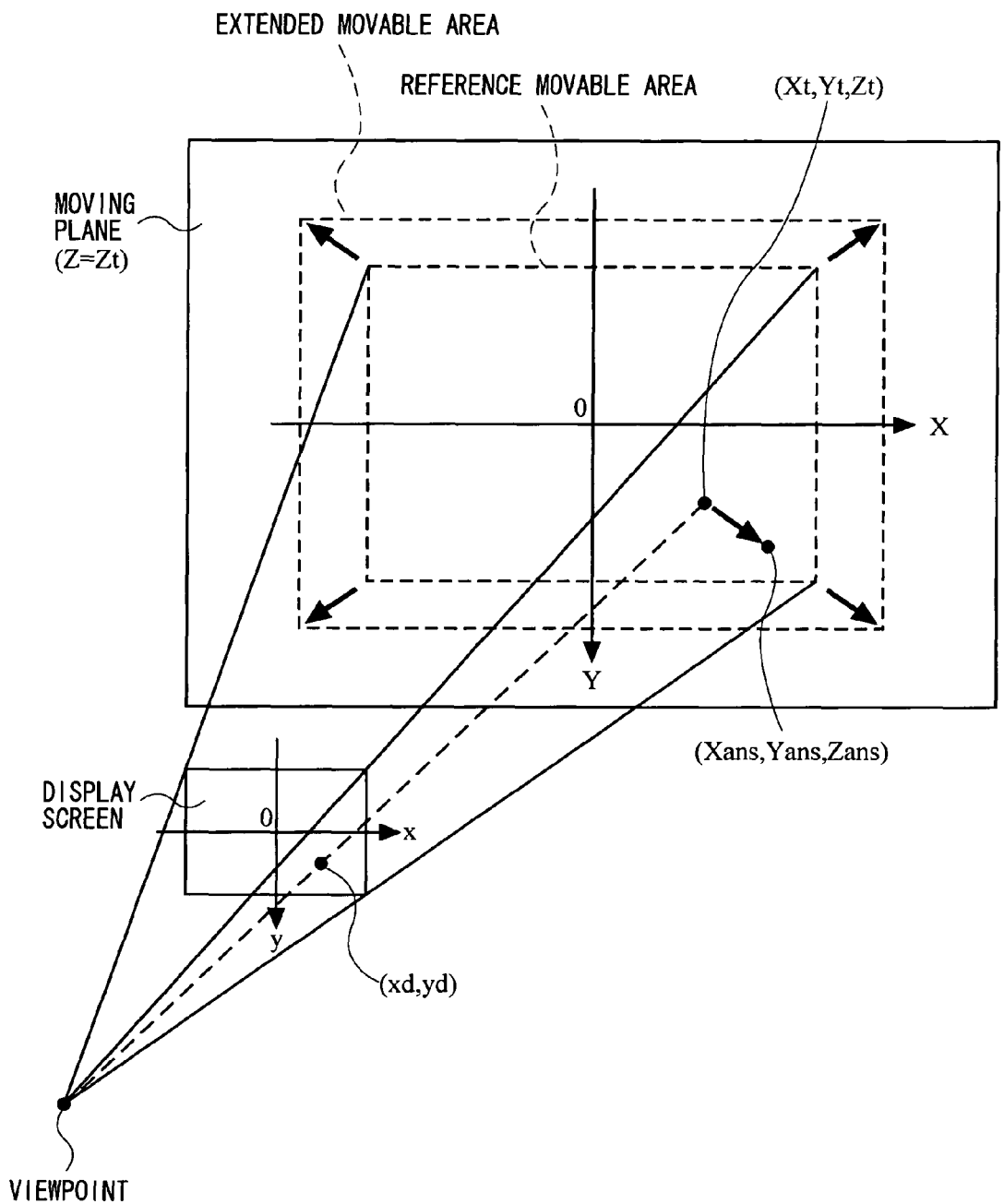
FIG. 19 is a conceptual diagram showing an image position and movable area set in a virtual game space.
Figure 20A:
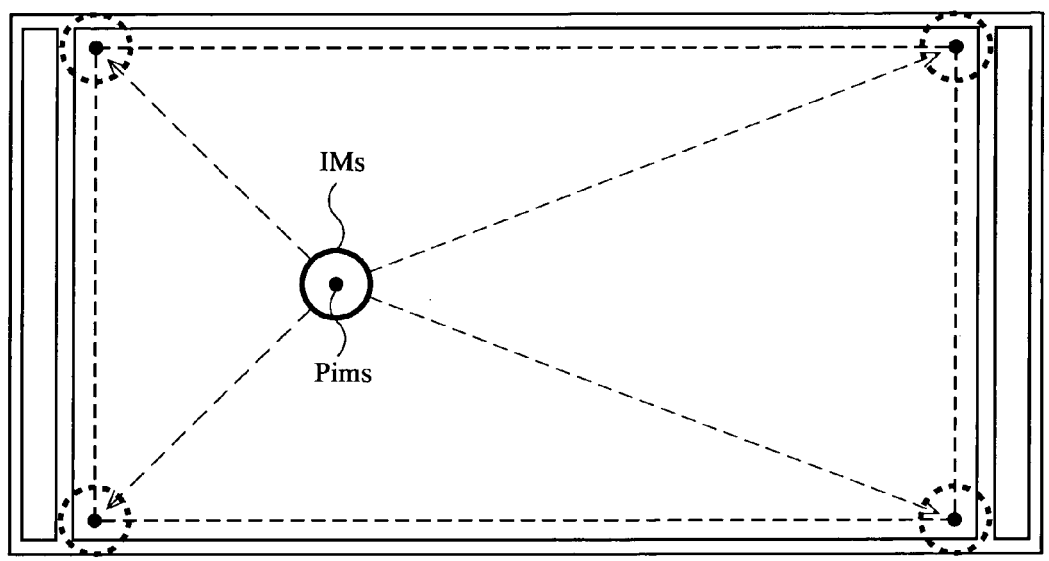
FIG. 20A shows a conventional movable area for an image having a relatively low enlargement ratio.

Next, image processing performed by the game apparatus body 5 will be described in detail with reference to FIGS. 16 to 19. FIG. 16 is a flowchart showing a sequence of the image processing performed by the game apparatus body 5. FIG. 17 is a subroutine showing in detail a distance calculation process at steps 52 and 65 of FIG. 16. FIG. 18 is a diagram for describing an operation to calculate the distance D. FIG. 19 is a conceptual diagram showing an image position and a movable area set in the virtual game space. Note that, flowcharts of FIGS. 16 and 17 mainly illustrate, among a plurality of processes performed in the game processing, a process for displaying the image IM on the monitor 2, and detailed descriptions of the other processes which are not directly relevant to the present invention will be omitted. In FIGS. 16 and 17, each step performed by the CPU 10 is abbreviated as "S".

When the power button 24 of the game apparatus body 5 is turned on, the CPU 10 of the game apparatus body 5 executes the boot program stored in the ROM/RTC 13, thereby initializing each unit such as the main memory. Then, the game program stored in the optical disc 4 or other storage medium is loaded to the main memory, whereby the game program becomes ready to be executed by the CPU 10. The flowchart shown in FIG. 16 shows image processing which is performed after this process is completed.

As shown in FIG. 16, the CPU 10 obtains the operation information received from the controller 7 (step 50), and then proceeds to a next step. Next, the CPU 10 updates the operation information Da by using the most recently obtained operation information. The operation information obtained at step 50 contains, in addition to the process result data indicating the positions of the markers 8L and 8R in the taken image, key data indicating a manner in which an operation section 72 of the controller 7 has been operated. Here, the communication section 75 transmits the operation information to the game apparatus body 5 at predetermined time intervals (e.g., every 5 ms). The CPU 10 uses, at each frame, the most recently transmitted operation information to update the first coordinate data Da1, second coordinate data Da2 and key data Da3.

Next, the CPU 10 determines whether or not to start predetermined image processing (step 51). For example, the CPU 10 determines to start the image processing by referring to the key data Da3 and detecting that an option to start the image processing has been selected or that a button to start the image processing has been pressed. In the case of starting the image processing, the CPU 10 proceeds to a next step S52, whereas in the case of not starting the image processing, the CPU 10 returns to step 50, and reiterates the processes.

At step 52, the CPU 10 performs the distance calculation process, and then proceeds to a next step. In the distance calculation process, the distance D between the controller 7 and the markers 8L and 8R is calculated based on the first coordinate data Da1 and second coordinate data Da2, which have been transmitted from the controller 7 and stored in the main memory 33. Hereinafter, the distance calculation process at step 52 will be described in detail with reference to FIGS. 17 and 18.

As shown in FIG. 17, the CPU 10 refers to the first coordinate data Da1 and second coordinate data Da2 (step 71), and calculates a distance mi (step 72). As shown in FIG. 18, the distance mi is a distance between two points in an image taken by the imaging information calculation section 74 of the controller 7. These two points correspond to images of the markers 8L and 8R in the taken image, and data indicating coordinates of the two points are contained in the first coordinate data Da1 and second coordinate data Da2. Accordingly, the CPU 10 can calculate the distance mi by using the first coordinate data Da1 and second coordinate data Da2. To be specific, when the first coordinate data Da1 are position coordinates (Lx, Ly) and the second coordinate data Da2 are position coordinates (Rx, Ry), the distance mi is calculated by the following equation.

$$mi = \sqrt{(Rx-Lx)^2 + (Ry-Ly)^2}$$

Next, the CPU 10 calculates a width w (refer to FIG. 18) which indicates, with respect to setting positions of the markers 8L and 8R, a width for which the image pickup element 743 is able to take an image (step 73). The width w is obtained by the following equation.

$$w = wi \times m/mi$$

Here, m represents a setting distance between the markers 8L and 8R (actual setting distance between the markers 8L and 8R; e.g., 20 cm), and is a fixed value. Also, wi represents a width wi of the image taken by the image pickup element 743, the width wi corresponding to the width w. The width wi is also a fixed value. Since the setting distance m and width wi are fixed values, these values are prestored in storage means within the game apparatus body 5. Note that, the player is allowed to discretionarily determine the setting positions of the markers 8L and 8R in accordance with the player's environment, thereby determining the setting distance m. In such a case, if the player inputs, as the setting distance m, a distance between the discretionarily determined setting positions of the markers 8L and 8R, the above equation can be used in the same manner as described above.

Next, the CPU 10 calculates the current distance D (refer to FIG. 18) between the image pickup element 743 (controller 7) and the markers 8L and 8R, by using the width w and a viewing angle θ of the image pickup element 743, and updates the current distance data Db3 (step 74). Then, the distance calculation process in the subroutine ends. Here, the current distance D is calculated by the following equation.

$$D = (w/2)/\{\tan(\theta/2)\}$$

Since the viewing angle θ is a fixed angle, the angle θ is prestored in the storage means within the game apparatus body 5.

Return to FIG. 16. After performing the process for calculating the distance D at step 52, the CPU 10 sets, as the reference distance Dbs, the distance D stored in the current distance data Db3, updates the reference distance data Db4 (step 53), and then proceeds to a next step. In other words, the reference distance Dbs is the distance from the controller 7 to the markers 8L and 8R at the start of image processing.

Next, the CPU 10 calculates designated coordinates and a designated direction (step 54), and proceeds to a next step. Hereinafter, an exemplary manner of calculating the designated coordinates and designated direction will be described.

For example, the CPU 10 calculates a direction from the position coordinates (Lx, Ly) indicated by the first coordinate data Da1 to the position coordinates (Rx, Ry) indicated by the second coordinate data Da2, and a middle point between the position coordinates (Lx, Ly) and the position coordinates (Rx, Ry). Then, the CPU 10 updates the direction data Db1 and middle point data Db2. To be specific, the CPU 10 refers to the first coordinate data Da1 and second coordinate data Da2, thereby calculating coordinates of the middle point, and then updates the middle point data Db2. Here, when the target images (markers 8L and 8R) in the taken image are seen as a single image, the middle point indicates a position of the single image. A change in the position of the image, which change occurs in response to the controller 7 having changed a position thereof with respect to the monitor 2, can be calculated based on a difference between the middle point and a predetermined reference position.

Described below is a positional relationship among the controller 7, the display screen of the monitor 2, and the markers 8L and 8R. For example, described below is a case where the markers 8L and 8R are provided on a top surface of the monitor 2 (see FIG. 1), and the player points at the center of the display screen of the monitor 2 by using the controller 7 whose top surface is facing in an upper direction (i.e., a case where an image of the center of the display screen is present at the center of an image taken by the imaging information calculation section 74). At this point, in the image taken by the imaging information calculation section 74, a middle point between the target images (middle point between the markers 8L and 8R) does not coincide with the center of the taken image. To be specific, the target images in the taken image are in upper positions than the center of the taken image. Here, when the target images are in such positions in the taken image, the positions are set as reference positions, and the center of the display screen is assumed to be pointed by the controller 7. When the controller 7 moves, the positions of the target images in the taken image move accordingly (a moving direction of the target images is opposite to that of the controller 7). For this reason, by performing processing for moving the pointed position on the display screen in accordance with a change in the positions of the target images in the taken image, the position (xd, yd) pointed by the controller 7 can be calculated with respect to the display screen. Here, the reference positions may be set such that the player points at a predetermined position on the display screen beforehand, and the positions of the target images at the time may be stored as the reference positions associated with the predetermined position. Alternatively, if a positional relationship between the display screen and the target images is fixed, the reference positions may be preset. The above position coordinates (xd, yd) with respect to the display screen are calculated by linear conversion using a function for calculating, based on the middle point, coordinates with respect to the display screen of the monitor 2. The function used herein is for converting coordinate values of the middle point, which are calculated from a particular taken image, to coordinate values (xd, yd) representing a position on the display screen, which position has been pointed by the controller 7 when the taken image has been taken. By using this function, the pointed position (xd, yd) can be calculated, with respect to the display screen, from the middle point coordinates. Note that, in the case where the player points at the display screen of the monitor 2 by using the controller 7 whose top surface is facing in other direction than the upper direction (e.g., facing to the right), the middle point coordinates are corrected using the direction stored in the direction data Db1, and then the pointed position (xd, yd) is calculated as described above with respect to the display screen, by using the corrected middle point coordinates.

Further, the calculated pointed position (xd, yd) with respect to the display screen is converted by the CPU 10 to a corresponding position in a virtual game space, whereby designated coordinates (Xt, Yt, Zt) are calculated, and the designated coordinates data Db 5 is updated. For example, when an XY coordinate system is set having the center of the display screen as a coordinate origin as shown in FIG. 19, the designated coordinates (Xt, Yt, Zt) corresponding to the pointed position (xd, yd) represent a position in the virtual game space displayed on the display screen of the monitor 2 (e.g., a position which is perspective-projected on a Z=Zt plane (moving plane) in the virtual game space). To be specific, the CPU 10 calculates the designated coordinates (Xt, Yt, Zt) by using the equation below.

$$\begin{pmatrix} Xt \\ Yt \\ Zt \end{pmatrix} = \begin{pmatrix} \text{PROJECTION MATRIX} \end{pmatrix}^{-1} \times \begin{pmatrix} xd \\ yd \\ 1 \end{pmatrix}$$

Similarly, the CPU 10 converts the direction stored in the direction data Db1 (vector data) to a corresponding designated direction in the virtual game space, and updates the designated direction data Db6. For example, the CPU 10 converts the direction stored in the direction data Db1 to a designated direction to be projected on the aforementioned moving plane set in the virtual game space, and updates the designated direction data Db6. This allows the player to intuitively determine an orientation of the image Im in accordance with an orientation of the controller 7.

Next, the CPU 10 sets scale values (Sx, Sy) of the image IM, and updates the image scale value data Dc1 (step 55), and proceeds to a next step. For example, the CPU 10 refers to the distance D contained in the current distance data Db3 and the reference distance Dbs contained in the reference distance data Db4, thereby calculating the scale values (Sx, Sy) based on the following equations.

$Sx=2.0+(Dbs-D)/a1$ $Sy=Sx$

Here, a1 is an invariable, e.g., a1=17.5. Note that, the scale values Sx and Sy which the CPU 10 takes are both in a range from 0.4 to 20.0. To be specific, when results of calculation by the above equations show that the scale values Sx and Sy are both smaller than 0.4, the CPU 10 sets both the scale values Sx and Sy to 0.4. Also, when results of calculation by the above equations show that the scale values Sx and Sy are both greater than 20.0, the CPU 10 sets both the scale values Sx and Sy to 20.0. As is clear from the above equations, the invariable a1 is a value for adjusting sensitivity to change, in accordance with a change in the distance D, the scale values (Sx, Sy), and the value may be set to an arbitrary value in accordance with later-described sensitivity to enlarge/reduce the image IM.

Subsequently, the CPU 10 sets scale values (STx, STy) of a moving amount of the image IM, and updates the moving amount scale value data Dc2 (step 56). Then, the processing proceeds to a next step. For example, the CPU 10 refers to the scale values (Sx, Sy) contained in the image scale value data Dc1, and calculates the scale values (STx, STy) based on the following equations.

$STx=Sx/a2+a3$ $Sty=Sy/a4+a5$

Here, a2 to a5 are invariables, e.g., a2=9.0, a3=1.0, a4=5.0 and a5=1.0. These invariables a2 to a5 are parameters used for naturally moving the image IM on the display screen, and are set to arbitrary values in accordance with, e.g., an aspect ratio of the monitor 2.

Then, the CPU 10 sets the movable area within the virtual game space, and updates the movable area data Dc3 (step 57). Then, the processing proceeds to a next step. For example, the CPU 10 refers to the scale values (STx, Sty) contained in the moving amount scale value data Dc2, and sets the movable area within which the image position Pim is placeable. To be specific, the virtual game space has, as shown in FIG. 19, the XY coordinate system set on the Z=Zt plane (moving plane), the XY coordinate system having a gazing point as a coordinate origin. Then, for a reference movable area, which is preset on the moving plane by having the aforementioned coordinate origin as a center thereof, the CPU 10 multiplies the scale value STx by a length of the reference movable area in an X-axis direction, and multiplies the scale value Sty by a length of the reference movable area in a Y-axis direction, thereby calculating a movable area which is a result of enlarging/reducing the reference movable area with respect to the above coordinate origin. Note that, shown in the example of FIG. 19 is a movable area which is a result of enlarging the reference movable area with respect to the coordinate origin of the XY coordinate system.

Next, the CPU 10 sets the image position Pim, and updates the image position data Dc4 (step 58). Then, the processing proceeds to a next step. For example, the CPU 10 refers to the designated coordinates (Xt, Yt, Zt) contained in the designated coordinates data Db5 and the scale values (STx, Sty) contained in the moving amount scale value data Dc2, thereby calculating coordinates of the image position Pim (Xans, Yans, Zans) based on the following equations.

$Xans=STx \times Xt$ $Yans=STy \times Yt$ $Zans=Zt$

For example, the virtual game space has, as shown in FIG. 19, the XY coordinate system set on the Z=Zt plane (moving plane), the XY coordinate system having the gazing point as a coordinate origin. Then, the image position Pim is set on a position (Xans, Yans, Zans) on the moving plane, which position results from increasing/reducing, in accordance with the scale values (STx, Sty), X-axis and Y-axis coordinate values of the designated coordinates (Xt, Yt, Zt) on the moving plane, the designated coordinates corresponding to the position (xd, yd) pointed by the controller 7. In other words, the image position Pim is calculated based on the designated coordinates (Xt, Yt, Zt), and when the designated coordinates (Xt, Yt, Zt) move on the moving plane, the image position Pim moves on the moving plane by a moving amount resulting from increasing/reducing the moving distance of the designated coordinates in accordance with the scale values (STx, Sty).

Note that, in the case where the image position Pim, which is calculated by the process at the above step 58, is set to be outside the movable area set at the above step 57, the CPU 10 resets the image position Pim so as to be within the movable area, and then updates the image position data Dc4. As one example, when the image position Pim is set to be outside the movable area, the CPU 10 resets the image position Pim so as to be at a boarder of the movable area, which is the nearest boarder to the set image position Pim. As another example, when the image position Pim is set to be outside the movable area, the CPU 10 resets the image position Pim so as to be at an intersection point of a line, which connects the set image position Pim and the coordinate origin of the XY coordinate system on the moving plane (i.e., the gazing point), and a boarder of the movable area. As a result of this process, the image position Pim is always placed within the movable area set at the above step 57.

Next, the CPU 10 sets the image angle Aim, and updates the image angle data Dc5 (step 59). Then, the processing proceeds to a next step. For example, based on the designated direction contained in the designated direction data Db6, the CPU 10 calculates the image angle Aim which indicates a display orientation of the image IM along the moving plane (e.g., upward orientation of the image IM).

Next, the CPU 10 enlarges/reduces the image IM in accordance with the scale values (Sx, Sy) (step 60), and proceeds to a next step. For example, the CPU 10 refers to image data contained in the image data Dc6, which image data indicates the image IM, and enlarges the image IM by an enlargement ratio Sx in a lateral direction and by an enlargement ratio Sy in a longitudinal direction. Here, as is clear from the process at step 55, when the controller 7 is moved toward the markers 8L and 8R so as to be at a shorter distance to the markers 8L and 8R than the reference distance Dbs, the scale values (Sx, Sy) are set to be greater, accordingly. Therefore, when the player moves the controller 7 toward the monitor 2, the image IM is enlarged, whereas when the player moves the controller 7 away from the monitor 2, the image IM is reduced.

Next, the CPU 10 places the image IM in the virtual game space in accordance with the image position Pim and image angle Aim (step 61), and proceeds to a next step. To be specific, the CPU 10 places the image IM, which has been enlarged/reduced at the above step 60, on the moving plane in accordance with the image position Pim and in an orientation corresponding to the image angle Aim. For example, as shown in FIGS. 12 and 13, the image IM is a human figure resembling the player, and the image IM is placed on the moving plane such that the image position Pim is positioned at the center of the human figure (e.g., near the waist). Further, a placement angle of the image IM rotates around the image position Pim in accordance with the image angle Aim.

Next, the CPU 10 displays on the monitor 2 an image of the virtual game space seen from a predetermined viewpoint (see FIG. 19) (step 62). Then, the CPU 10 determines whether or not to terminate the image processing started at the above step 51 (step 63). When the CPU 10 continues the image processing, the CPU 10 proceeds to a next step 64, whereas when the CPU 10 terminates the image processing, the CPU 10 ends the processing according to the flowchart.

At step 64, the CPU 10 obtains the operation information received from the controller 7. Then, the CPU 10 performs the distance calculation process (step 65), and returns to the above step 54 to reiterate the processes. Note that, since the operation performed at step 64 is the same as that of the above-described step 50, and the operation performed at step 65 is the same as that of the above-described step 52, detailed descriptions thereof will be omitted.

As described above, according to the game apparatus body 5 of the present embodiment, when the player moves the controller 7 toward the monitor 2, the displayed image IM is enlarged, and the area within which the image IM can be moved is also enlarged. On the other hand, when the player moves the controller 7 away from the monitor 2, the displayed image IM is reduced, and the area within which the image IM can be moved is also reduced. Consequently, when the image IM has a high enlargement ratio, the movable area is set to be large, whereby operability deterioration, e.g., the movable area becoming insufficient in size for the image having a high enlargement ratio, is prevented. Also, when the image IM has a low enlargement ratio, i.e., when the displayed image IM is reduced, the movable area is reduced, whereby the image IM is prevented from disappearing from the display area.

Further, according to the game apparatus body 5 of the present embodiment, the moving amount of the image position Pim is greater in the case where the image position Pim is designated when the controller 7 is positioned near the monitor 2 than in the case where the image position Pim is designated when the controller 7 is at a remote position from the monitor 2. As a result, increase/decrease, caused by a difference in distance between the controller 7 and monitor 2, of the moving amount of the image position Pim in relation to an amount of change in the position pointed by the controller 7, is lessened. In other words, for the player using the controller 7 to perform an operation to move the pointed position, a significant change in operability does not occur even if the distance between the controller 7 and the monitor 2 changes. This allows the player to perform the operation without feeling discomfort.

Still further, since the player can perform the image enlargement/reduction process only by changing the distance between the controller 7 and monitor 2, the player is allowed to change the enlargement ratio of the displayed image by a simple operation. Also, the image IM displayed on the monitor 2 moves or rotates in response to the controller 7 having been moved from side to side and up and down with respect to the monitor 2 or having been twisted to the right and left with respect to the monitor 2. Thus, the displayed image can be moved/rotated by a simple operation.

The above description of the image processing gives an example in which the movable area is set in accordance with the enlargement ratio of the image IM. However, the movable area may be set in accordance with, in addition to the enlargement ratio, a shape of the image IM (e.g., aspect ratio of the image) and placement angle of the image IM. For example, the aforementioned invariables a2 to a5 may be adjusted in accordance with the aspect ratio of the image IM. This enables the aspect ratio of the movable area to be corrected in accordance with the aspect ratio of the image IM. Further, in addition to the aspect ratio of the image IM, the placement angle of the image IM may be taken into account to adjust the invariables a2 to a5. For example, when a vertically long image IM is rotated by 90° and then placed, the image IM becomes a horizontally long image. The shape of the image IM, which changes in accordance with the placement angle, may be taken into account when changing the invariables a2 to a5 in accordance with the aspect ratio and image angle Aim of the image IM, whereby the aspect ratio of the movable area may be corrected.

Still further, in the above description of the image processing, the image is small in size when the distance between the controller 7 and monitor 2 is long, and large in size when the distance is short. However, this may be set in the opposite manner. In other words, the present invention is applicable even in the case where the image is set to be large when the distance between the controller 7 and monitor 2 is long, and set to be small when the distance is short. In such a case, as a specific example, the above step 55 may be performed based on the following equation.

$$Sx=18.0+(D-Dbs)/a1$$

The present invention is not limited to controlling the enlargement ratio of an image in accordance with the distance between the controller 7 and monitor 2, but applicable to general image processing for enlarging, reducing and moving an image. For example, even if the present invention is applied to a process for placing an image at coordinates inputted by a mouse and enlarging/reducing the image through a key operation or other operation, the effect of the present invention can be obtained by controlling, in accordance with the enlargement ratio of the image, a moving amount and moving range of the coordinates in relation to a positional change of the mouse.

Still further, in the above description of the image processing, the scale values (Sx, Sy) of the image IM and the scale values (STx, STy) of the moving amount are set to be different from each other. This enables separate adjustment of the enlargement/reduction of the image and the control of the moving amount, whereby the image IM is allowed to be naturally moved in accordance with the aspect ratio of the display screen while being enlarged/reduced longitudinally and laterally with a same enlargement ratio. However, when such effect is unnecessary, the scale values (STx, STy) of the moving amount may be set to be the same as the scale values (Sx, Sy) of the image IM.

Still further, the above description of the image processing gives an example in which the image IM, which is placed in a three-dimensional virtual game space, is displayed. However, the image which is placed in a different type of game space may be displayed. It is understood that the present invention can be realized even for, e.g., image processing for enlarging/reducing and moving/rotating a two-dimensional image IM placed in a two-dimensional virtual game space.

Still further, it is described above that the processes for, e.g., enlarging, reducing, moving and rotating the image in accordance with the position and orientation of the controller 7 are performed at any time from the start to the end of the image processing. However, the processes may be performed only when a predetermined operation is performed on the controller 7. For example, only when the player is pressing a predetermined button of the controller 7 (e.g., operation button 72i), the processes for, e.g., enlarging, reducing, moving and rotating the image may be performed. In this case, the image processing may be performed by setting the distance D, which is obtained when the predetermined button starts to be pressed, as the reference distance Dbs.

In the above description, the distance D is calculated by analyzing the image data of the image taken by the image pickup element 743. However, the above invention can be implemented as long as the distance D to a predetermined measuring target placed in a real space is measured in any manner. For example, a supersonic sensor or a magnetic sensor may be used as means of calculating the distance D.

The distance D may not necessarily directly be calculated if there is any manner to obtain a value related to a distance between the image pickup element 743 and an imaging target (s), because operation inputs can be performed as long as such a value is obtained. In such a case, data corresponding to a distance between the markers 8L and 8R in the taken image may be prepared in advance, and by using the data, the image processing may be performed.

Further, in the above description, the image data of the image taken by the image pickup element 743 is analyzed to obtain the position coordinates, center of gravity coordinates and the like of the infrared lights emitted from the markers 8L and 8R. The process result data indicating such coordinates and the like is generated by the controller 7, and transmitted to the game apparatus body 5. However, data, which can be obtained in the middle of a process performed by the controller 7 for generating the process result data, may be transmitted from the controller 7 to the game apparatus body 5. For example, the image data of the image taken by the image pickup element 743 may be transmitted from the controller 7 to the game apparatus body 5, and the process result data may be obtained as a result of analyzing the image data at the CPU 10. In this case, the image processing circuit 744 provided within the controller 7 is no longer necessary. Alternatively, data as a result of partly analyzing the image data may be transmitted from the controller 7 to the game apparatus body 5. For example, data indicating a brightness, position, square measure and the like obtained from partly performing the analysis of the image data may be transmitted from the controller 7 to the game apparatus body 5, and the rest of the analysis may be performed by the CPU 10 to obtain the process result data.

Still further, in the above description, the infrared lights from the markers 8L and 8R are the imaging targets of the imaging information calculation section 74 of the controller 7. However, a different object may be used as an imaging target. For example, one or more than three markers may be placed in the vicinity of the monitor 2, and an infrared light(s) emitted therefrom may be used as an imaging target(s) of the imaging information calculation section 74. For example, the present invention may be realized by placing near the monitor 2 a single marker having a predetermined length between both ends thereof, and using the predetermined length as the setting distance m (see FIG. 18). Alternatively, the display screen of the monitor 2 or another illuminant (e.g., interior light) may be used as the imaging target of the imaging information calculation section 74. Various illuminants can be used as imaging targets of the imaging information calculation section 74, by using a manner of calculating, based on a positional relationship between an imaging target and the display screen of the monitor 2, a position of the controller 7 in relation to the display screen of the monitor 2.

Still further, in the above description, the controller 7 and the game apparatus body 5 are connected by radio communication. However, the controller 7 and game apparatus body 5 may be electrically connected by a cable. In such a case, the cable connected to the controller 7 is connected to a connecting terminal of the game apparatus body 5.

It is understood that the shapes of the controller 7 and the operation sections 72 mounted thereon, the number of operation sections 72, the positions in which the operation sections 72 are provided, the equations and invariables used for the image processing, and the like in the above description are merely examples. The present invention can be realized even if these shapes, numbers, positions, equations, invariables and the like are different from the above description. Also, the position of the imaging information calculation section 74

(the position of the light entrance of the imaging information calculation section 74) of the controller 7 is not necessarily on the front surface of the housing 71. The imaging information calculation section 74 may be provided on any other surface of the housing 71 as long as the image calculation section 74 is able to externally receive a light.

Although the game apparatus body 5 is operated by the controller 7 in the present embodiment, the game apparatus body 5 may be a general information processing apparatus such as a personal computer which is operated by an input device having image pickup means. In such a case, a program to be executed by a computer of the information processing apparatus is not limited to a typical game program used for a game. The program to be executed may be an all-purpose image processing program which is used for image processing by the information processing apparatus.

The image processing program of the present invention may be supplied to the game apparatus body 5 not only via an external storage medium such as the optical disc 4, but also via a wired or wireless communication line. Further, the image processing program may be prestored in a non-volatile storage device provided within the game apparatus body 5. Note that, an information storage medium for storing the image processing program may be a CD-ROM, DVD or other similar optical disc storage medium, or may be a non-volatile semiconductor memory.

The storage medium storing the image processing program and the image processing apparatus according to the present invention are capable of properly controlling the movement of an image in accordance with the enlargement ratio of the image or the distance between the image-pickup device and the imaging targets, and are useful as a program and an apparatus for performing various image processing such as game processing.

While the invention has been described in detail, the foregoing description is in all aspects illustrative and not restrictive. It is understood that numerous other modifications and variations can be devised without departing from the scope of the invention.

What is claimed is:

1. A non-transitory computer-readable storage medium storing an image processing program to be executed by a computer of an image processing apparatus for: enlarging or reducing an image; placing the image on a predetermined placement position in relation to a display area in accordance with a predetermined designation input; and displaying the image, the image processing program causing the computer to perform:
   obtaining the designation input;
   setting an enlargement ratio of the image, and enlarging or reducing the image in accordance with the enlargement ratio;
   in accordance with the set enlargement ratio, changing, in relation to the display area, an area within which the placement position is allowed to be set;
   based on the obtained designation input, calculating a position within the area as the placement position, the position corresponding to the designation input;
   placing, on the placement position, the enlarged image; and
   displaying the placed image.

2. The non-transitory storage medium storing the image processing program according to claim 1, wherein the area is set so as to extend in accordance with an increase in the enlargement ratio.

3. The non-transitory storage medium storing the image processing program according to claim 2, wherein the designation input is obtained from an input device having an image-pickup device for taking an image of a predetermined imaging target,
the image processing program further causes the computer to perform calculating a distance between the imaging target and the image-pickup device,
the enlargement ratio is increased in accordance with a decrease in the distance, and
the placement position is calculated based on the enlargement ratio and a position of the imaging target in the image taken by the image-pickup device.

4. The non-transitory storage medium storing the image processing program according to claim 3, wherein the placement position in the set area is calculated by changing, based on the enlargement ratio, a rate of change of the placement position in relation to a change of the position of the imaging target in the taken image.

5. The non-transitory storage medium storing the image processing program according to claim 3, wherein a plurality of imaging targets are provided, and
a distance between the image-pickup device and the imaging targets is calculated based on a distance between the imaging targets in the taken image.

6. The non-transitory storage medium storing the image processing program according to claim 5, further causing the computer to perform:
   calculating an orientation of the input device, based on a gradient between the imaging targets in the taken image; and
   determining an orientation of the image in accordance with the orientation of the input device, wherein
   the enlarged or reduced image is placed in the determined orientation.

7. The non-transitory storage medium storing the image processing program according to claim 1, wherein an aspect ratio of the image is used to change the area within which the placement position is allowed to be set, thereby changing an aspect ratio of the area which is changed in accordance with the enlargement ratio.

8. The non-transitory storage medium storing the image processing program according to claim 7, further causing the computer to perform determining an orientation of the image in accordance with the designation input, wherein the aspect ratio and the orientation of the image are used to change the area within which the placement position is allowed to be set, thereby changing the aspect ratio of the area which is changed in accordance with the enlargement ratio.

9. An image processing apparatus for: enlarging or reducing an image; placing the image on a predetermined placement position in a display area of a display device in accordance with a predetermined designation input; and displaying the image, the image processing apparatus comprising:
   designation input obtaining device for obtaining the designation input;
   a processor;
   a memory coupled to said processor, said memory storing instructions that, when executed by said processor, control said processor to:
   set an enlargement ratio of the image, and enlarge or reduce the image in accordance with the enlargement ratio;
   in accordance with the set enlargement ratio, change, in relation to the display area, an area within which the placement position is allowed to be set;
   based on the designation input obtained by the designation input obtaining device, calculate a position within the area as the placement position, the position corresponding to the designation input;

place, on the placement position, the enlarged or reduced image; and display the placed image on a display device.

10. The image processing apparatus according to claim 9, wherein the area is set so as to extend in accordance with an increase in the set enlargement ratio.

11. The image processing apparatus according to claim 10, wherein the designation input is obtained from an input device having an image-pickup device for taking an image of a predetermined imaging target, the memory further controlling the processor to calculate a distance between the imaging target and the image-pickup device, wherein the enlargement ratio is increased in accordance with a decrease in the distance, and the placement position is calculated based on the enlargement ratio and a position of the imaging target in the image taken by the image-pickup device.

12. An image processing system for: enlarging or reducing an image; placing the image on a predetermined placement position in a display area of a display device in accordance with a predetermined designation input; and displaying the image, the image processing system comprising:

designation input obtaining device for obtaining the designation input;

a processor:

a memory coupled to said processor, said memory storing instructions that, when executed by said processor, control said processor to:

set an enlargement ratio of the image, and enlarge or reduce the image in accordance with the enlargement ratio;

in accordance with the set enlargement ratio, change, in relation to the display area, an area within which the placement position is allowed to be set;

based on the designation input obtained by the designation input obtaining device, calculate a position within the area as the placement position, the position corresponding to the designation input;

place, on the placement position, the enlarged or reduced image; and display the placed image on a display device.

13. A method for enlarging or reducing an image, placing the image at a placement position in a display area in accordance with a predetermined designation input; and displaying the image, the method comprising:

obtaining the designation input with a processor;

setting an enlargement ratio with the processor of the image, and enlarging or reducing the image in accordance with the enlargement ratio;

in accordance with the set enlargement ratio, changing with the processor, in relation to the display area, an area within which the placement position is allowed to be set;

based on the obtained designation input, calculating with the processor a position within the area as the placement position, the position corresponding to the designation input;

placing with the processor, on the placement position, the enlarged image; and displaying the placed image.

* * * * *